United States Patent
Schroeder et al.

(10) Patent No.: US 11,353,084 B2
(45) Date of Patent: Jun. 7, 2022

(54) ROTARY ACTUATOR DRIVEN VIBRATION ISOLATION

(71) Applicant: ClearMotion Acquisition I LLC, Woburn, MA (US)

(72) Inventors: Thomas C. Schroeder, Southborough, MA (US); Robert Preston Parker, Westborough, MA (US); Dariusz Antoni Bushko, Hopkinton, MA (US); Brian A. Selden, Concord, MA (US); Mark A. Hayner, Belmont, MA (US); Brian M. Lucas, Marblehead, MA (US)

(73) Assignee: ClearMotion Acquisition I LLC, Billerica, MA (US)

( * ) Notice: Subject to any disclaimer, the term of this patent is extended or adjusted under 35 U.S.C. 154(b) by 27 days.

(21) Appl. No.: 13/843,162

(22) Filed: Mar. 15, 2013

(65) Prior Publication Data
US 2014/0263932 A1    Sep. 18, 2014

(51) Int. Cl.
*F16F 15/02*    (2006.01)
*B60N 2/50*    (2006.01)
(Continued)

(52) U.S. Cl.
CPC .............. *F16F 15/02* (2013.01); *B60N 2/501* (2013.01); *B60N 2/502* (2013.01); *B60N 2/508* (2013.01);
(Continued)

(58) Field of Classification Search
CPC ........ B60N 2/501; B60N 2/502; B60N 2/505; B60N 2/508; B60N 2/1615;
(Continued)

(56) References Cited

U.S. PATENT DOCUMENTS

| | | | |
|---|---|---|---|
| 619,527 A * | 2/1899 | Woods | B60K 1/00 180/61 |
| 2,206,901 A | 7/1940 | Klotsch | |

(Continued)

FOREIGN PATENT DOCUMENTS

| | | |
|---|---|---|
| CN | 1367744 A | 9/2002 |
| CN | 1396393 A | 2/2003 |

(Continued)

OTHER PUBLICATIONS

Office Action dated Sep. 16, 2016 by the Japanese Patent Office for corresponding JP Application No. 2016-502304.
(Continued)

*Primary Examiner* — Muhammad Ijaz
*Assistant Examiner* — Taylor L Morris
(74) *Attorney, Agent, or Firm* — Wolf, Greenfield & Sacks, P.C.

(57) ABSTRACT

An active vibration isolation system for isolating a suspended platform from vibration input to the vibration isolation system base includes an exoskeleton, a rotary actuator, and a drive mechanism separate from the exoskeleton for providing force output from the rotary actuator to the suspended plant. The rotary actuator may include inner and outer rotors which rotate relative to each other. The rotary actuator may be free to translate relative to the vibration isolation system base and the suspended platform, and both the inner and outer rotors may be free to rotate relative to the exoskeleton.

23 Claims, 16 Drawing Sheets

(51) Int. Cl.
    *F16F 7/10* (2006.01)
    *F16M 13/02* (2006.01)
(52) U.S. Cl.
    CPC .......... *F16F 7/1022* (2013.01); *F16F 7/1028* (2013.01); *B60G 2202/42* (2013.01); *F16M 13/02* (2013.01)
(58) Field of Classification Search
    CPC .... B60N 2/42763; B60N 2/12; B60N 2/0232; F16F 2232/04; F16F 15/02; F16F 15/03; B60P 1/06; B60G 2202/42; B60G 17/0157; B60G 2202/22; B66F 3/02; B66F 3/04; B66F 3/44; B66F 7/10; B66F 7/20; B66F 7/0608; B66F 7/065; B66F 3/12; B66F 3/22; B25J 9/107; B25J 9/126; H02K 16/02; H02K 16/00
    See application file for complete search history.

(56) References Cited

U.S. PATENT DOCUMENTS

| | | | |
|---|---|---|---|
| 2,483,668 A | 10/1949 | Reason | |
| 2,506,151 A | 5/1950 | Hoven | |
| 2,527,910 A | 10/1950 | Braden | |
| 2,590,711 A | 3/1952 | Krotz | |
| 2,590,859 A * | 4/1952 | Hickman | B60N 2/502 248/609 |
| 2,661,927 A * | 12/1953 | Hulsart | B66F 7/0633 254/10 R |
| 2,681,686 A | 6/1954 | Sheron | |
| 2,966,937 A * | 1/1961 | Rydberg | B60N 2/501 297/313 |
| 3,061,260 A * | 10/1962 | Simons | B60N 2/502 248/563 |
| 3,110,476 A * | 11/1963 | Farris | B65G 69/24 108/119 |
| 3,237,921 A * | 3/1966 | Jay | B66F 7/0608 108/147 |
| 3,291,431 A | 12/1966 | Daniel | |
| 3,451,655 A * | 6/1969 | Scott | B66F 3/44 254/7 R |
| 3,501,120 A | 3/1970 | Daniel | |
| 3,600,925 A | 8/1971 | Field et al. | |
| 3,623,707 A * | 11/1971 | Klopp | B66F 7/0608 254/22 |
| 3,638,897 A * | 2/1972 | Harder, Jr | B60N 2/501 248/550 |
| 3,645,501 A * | 2/1972 | Musgrove | B66F 3/12 254/126 |
| 3,680,401 A | 8/1972 | Shaw | |
| 3,684,243 A | 8/1972 | Andersen-Vie | |
| 3,685,780 A * | 8/1972 | Stannebein | A47C 3/22 248/430 |
| 3,716,213 A * | 2/1973 | Lacey | B60N 2/506 248/564 |
| 4,022,411 A * | 5/1977 | Rumsey | B60N 2/501 248/580 |
| 4,030,208 A | 6/1977 | Carver et al. | |
| 4,072,287 A * | 2/1978 | Swenson | B60N 2/502 248/421 |
| 4,123,039 A * | 10/1978 | Vig | B60P 1/02 254/9 C |
| 4,198,025 A * | 4/1980 | Lowe | B60N 2/501 248/550 |
| 4,397,440 A * | 8/1983 | Hall | B60N 2/162 248/550 |
| 4,405,101 A * | 9/1983 | Carlson | B64C 27/001 188/380 |
| 4,545,266 A | 10/1985 | Brems | |
| 4,607,578 A * | 8/1986 | Inoue | B23P 19/00 108/145 |
| 4,653,727 A * | 3/1987 | Chang | B66F 3/12 254/1 |
| 4,664,352 A * | 5/1987 | Shibuki | B60N 2/502 188/266.7 |
| 4,684,100 A * | 8/1987 | Grassi | B60N 2/501 248/550 |
| 4,749,169 A * | 6/1988 | Pickles | B66F 3/12 254/122 |
| 4,917,066 A * | 4/1990 | Freudenstein | F01B 7/12 123/197.4 |
| 4,941,797 A * | 7/1990 | Smillie, III | B60R 5/04 187/269 |
| 4,943,034 A * | 7/1990 | Wagnon | B66F 3/12 254/122 |
| 4,976,582 A * | 12/1990 | Clavel | B25J 9/1065 108/138 |
| 4,978,170 A * | 12/1990 | Pelz | B60N 2/767 297/411.39 |
| 4,989,161 A | 1/1991 | Oaki | |
| 5,253,853 A * | 10/1993 | Conaway | B62D 33/0608 180/89.15 |
| 5,272,847 A * | 12/1993 | Abiru | E04H 9/0215 52/167.2 |
| 5,305,981 A * | 4/1994 | Cunningham | B64G 1/283 244/173.2 |
| 5,315,890 A | 5/1994 | Long | |
| 5,327,856 A | 7/1994 | Schroeder et al. | |
| 5,339,749 A * | 8/1994 | Hirose | B23Q 1/5468 108/137 |
| 5,358,305 A * | 10/1994 | Kaneko | B60N 2/0224 180/89.14 |
| 5,397,209 A * | 3/1995 | Heim | B23Q 7/001 187/243 |
| 5,536,059 A | 7/1996 | Amirouche | |
| 5,580,027 A | 12/1996 | Brodersen | |
| 5,651,585 A * | 7/1997 | Van Duser | B60N 2/502 248/585 |
| 5,694,864 A * | 12/1997 | Langewellpott | B66F 7/0608 108/145 |
| 5,735,509 A * | 4/1998 | Gryp | B60N 2/501 248/550 |
| 5,772,385 A * | 6/1998 | Huntoon | B65F 3/043 414/408 |
| 5,797,469 A | 8/1998 | Gerigk | |
| 5,873,335 A | 2/1999 | Wright et al. | |
| 5,950,977 A * | 9/1999 | Proksch | B60N 2/502 108/145 |
| 5,953,776 A * | 9/1999 | Sanders | A61B 6/0457 108/145 |
| 5,954,400 A | 9/1999 | Brodersen | |
| 5,975,508 A * | 11/1999 | Beard | B60N 2/501 180/89.12 |
| 6,038,940 A * | 3/2000 | Rosheim | G09B 9/12 434/55 |
| 6,047,610 A * | 4/2000 | Stocco | B25J 17/0266 74/479.01 |
| 6,059,253 A | 5/2000 | Koutsky et al. | |
| 6,082,715 A | 7/2000 | Vandermolen | |
| 6,095,011 A | 8/2000 | Brogårdh | |
| 6,105,454 A * | 8/2000 | Bacchi | B25J 9/042 414/744.5 |
| 6,120,082 A | 9/2000 | Vandermolen | |
| 6,193,297 B1 | 2/2001 | Vandermolen | |
| 6,199,820 B1 | 3/2001 | Ritchie | |
| 6,220,587 B1 * | 4/2001 | McKenzie | B62D 29/046 267/256 |
| 6,286,819 B1 * | 9/2001 | Ritchie | B60N 2/501 248/550 |
| 6,297,611 B1 * | 10/2001 | Todorov | B25J 9/042 318/567 |
| 6,331,034 B1 * | 12/2001 | Specht | B60N 2/0232 297/362 |
| 6,336,627 B1 * | 1/2002 | Fujita | B60N 2/502 248/581 |
| 6,371,459 B1 | 4/2002 | Schick et al. | |
| 6,428,102 B1 * | 8/2002 | Becker | B60N 2/0284 297/337 |

(56) References Cited

U.S. PATENT DOCUMENTS

| | | | |
|---|---|---|---|
| 6,431,532 B1* | 8/2002 | McKenzie | B62D 29/046 267/256 |
| 6,467,748 B1 | 10/2002 | Schick et al. | |
| 6,581,437 B2* | 6/2003 | Chrystall | A43D 999/00 73/7 |
| 6,616,117 B2* | 9/2003 | Gryp | B60N 2/501 248/421 |
| 6,622,830 B2* | 9/2003 | Oliver | B60G 3/12 188/306 |
| 6,695,289 B1* | 2/2004 | Mickael | B66F 3/12 187/211 |
| 6,713,920 B2* | 3/2004 | Kang | H02K 7/06 310/112 |
| 6,719,258 B2* | 4/2004 | Bryngelson | B60N 2/502 248/419 |
| 6,786,896 B1 | 9/2004 | Madhani et al. | |
| 6,822,351 B2* | 11/2004 | Matsushita | H02K 37/14 310/257 |
| 6,840,200 B2 | 1/2005 | Miller | |
| 6,854,715 B2* | 2/2005 | Hicks | B66F 7/065 254/122 |
| 6,866,236 B2 | 3/2005 | Mullinix et al. | |
| 6,886,650 B2 | 5/2005 | Bremner | |
| 6,907,835 B1* | 6/2005 | Derner | B63C 3/00 114/44 |
| 6,935,693 B2 | 8/2005 | Janscha et al. | |
| 6,998,757 B2* | 2/2006 | Seguchi | H02K 21/16 310/68 B |
| 7,105,964 B2* | 9/2006 | Miyazaki | F16H 57/0482 310/75 R |
| 7,213,563 B2 | 5/2007 | Yaguchi et al. | |
| 7,275,332 B2* | 10/2007 | Blanding | F16C 11/12 248/178.1 |
| 7,326,143 B2* | 2/2008 | Kimura | F16H 1/32 475/149 |
| 7,413,158 B1* | 8/2008 | Burer | B60N 2/42736 248/421 |
| 7,466,053 B1* | 12/2008 | Radev | H02K 1/32 310/114 |
| 7,544,142 B2* | 6/2009 | Schuler | B60N 2/2352 475/149 |
| 7,544,143 B2* | 6/2009 | Schuler | H02K 7/116 475/150 |
| 7,576,465 B2* | 8/2009 | Bremner | H02K 21/029 310/114 |
| 7,694,946 B2 | 4/2010 | Shoemaker et al. | |
| 7,735,385 B2* | 6/2010 | Wilson | B25J 9/102 74/89.18 |
| 7,735,390 B2* | 6/2010 | Nabat | B25J 9/0051 74/490.03 |
| 7,811,008 B2* | 10/2010 | Dumm | F16M 11/18 396/419 |
| 7,887,033 B2 | 2/2011 | Shoemaker et al. | |
| 7,905,198 B2* | 3/2011 | Moon | B05B 13/0221 118/500 |
| 7,950,727 B2 | 5/2011 | Haeusler et al. | |
| 7,959,163 B2* | 6/2011 | Beno | B60G 5/02 280/5.5 |
| 7,983,813 B2 | 7/2011 | Ummethala et al. | |
| 7,988,131 B1* | 8/2011 | Carder | B66F 3/44 254/122 |
| 7,994,672 B2* | 8/2011 | Mock | H02K 7/1008 310/116 |
| 8,095,268 B2 | 1/2012 | Parison et al. | |
| 8,118,287 B2 | 2/2012 | Schordine | |
| 8,169,116 B2* | 5/2012 | Oya | H02K 41/03 310/112 |
| 8,227,768 B2* | 7/2012 | Smick | F16M 11/123 250/491.1 |
| 8,291,607 B2* | 10/2012 | Hill | A61B 5/1071 33/286 |
| 8,325,229 B2* | 12/2012 | Jones | G03B 17/00 348/143 |
| 8,342,541 B2 | 1/2013 | Wurmthaler et al. | |
| 8,360,387 B2 | 1/2013 | Breen et al. | |
| 8,413,942 B2* | 4/2013 | Ward | B60N 2/508 248/419 |
| 8,439,420 B2* | 5/2013 | Cantor | B60N 2/24 296/68.1 |
| 8,444,123 B2 | 5/2013 | Shoemaker et al. | |
| 8,464,603 B2* | 6/2013 | Quaid | F16H 21/44 74/490.03 |
| 8,616,645 B2* | 12/2013 | Ito | B60N 2/181 297/344.17 |
| 8,690,114 B2 | 4/2014 | Boyarski | |
| 8,844,894 B2* | 9/2014 | Archambault | B60N 2/508 248/421 |
| 8,899,559 B2* | 12/2014 | Whitaker | F16F 7/08 267/48 |
| 9,291,300 B2* | 3/2016 | Parker | F16M 13/02 |
| 9,682,642 B2* | 6/2017 | Fujita | B60N 2/544 |
| 9,758,078 B2* | 9/2017 | Haller | B60N 2/505 |
| 9,822,923 B2* | 11/2017 | Woodbury, II | F16M 11/24 |
| 9,896,836 B1* | 2/2018 | Downey | E04H 9/021 |
| 2001/0030400 A1 | 10/2001 | Zetterstrom | |
| 2001/0036398 A1* | 11/2001 | Hofmeister | B25J 9/042 414/744.1 |
| 2002/0006984 A1 | 1/2002 | Mahmud et al. | |
| 2003/0051946 A1* | 3/2003 | Chen | B66F 7/0633 187/211 |
| 2003/0201660 A1 | 10/2003 | Janscha et al. | |
| 2003/0218282 A1* | 11/2003 | Sakamoto | B60N 2/002 267/131 |
| 2004/0144906 A1 | 7/2004 | Hill et al. | |
| 2004/0232800 A1* | 11/2004 | Seguchi | F02N 11/04 310/266 |
| 2005/0043718 A1 | 2/2005 | Madhani et al. | |
| 2005/0200171 A1* | 9/2005 | Saiguchi | B60R 22/1951 297/216.12 |
| 2006/0016408 A1 | 1/2006 | Gaubatz et al. | |
| 2006/0099063 A1* | 5/2006 | Pietrantonio | B25J 18/00 414/744.5 |
| 2006/0180403 A1* | 8/2006 | Hanlon | B66B 9/0815 187/269 |
| 2006/0237885 A1 | 10/2006 | Paillard et al. | |
| 2006/0261647 A1 | 11/2006 | Maas et al. | |
| 2007/0018145 A1* | 1/2007 | Wang | B66F 3/12 254/126 |
| 2007/0034768 A1* | 2/2007 | Stenard | B60N 2/522 248/562 |
| 2007/0278025 A1 | 12/2007 | Shoemaker et al. | |
| 2008/0048161 A1* | 2/2008 | Meyer | B66F 3/12 254/2 R |
| 2008/0152463 A1* | 6/2008 | Chidambaram | B25J 9/107 414/217 |
| 2008/0190707 A1* | 8/2008 | Hoth | A61G 7/012 187/269 |
| 2009/0001679 A1 | 1/2009 | Kajino et al. | |
| 2009/0036804 A1* | 2/2009 | Horst | A61H 1/0237 601/5 |
| 2009/0045614 A1* | 2/2009 | Katsuda | B60N 2/4279 280/806 |
| 2009/0064808 A1 | 3/2009 | Parison et al. | |
| 2009/0167106 A1* | 7/2009 | Hashimoto | H02K 1/145 310/257 |
| 2009/0200527 A1* | 8/2009 | Christie | B66F 3/12 254/122 |
| 2009/0216378 A1* | 8/2009 | Murayama | B25J 9/107 700/275 |
| 2009/0256293 A1 | 10/2009 | Ward | |
| 2009/0283944 A1 | 11/2009 | Schordine | |
| 2010/0060061 A1* | 3/2010 | Koga | B60N 2/1803 297/344.1 |
| 2010/0066142 A1 | 3/2010 | Gross et al. | |
| 2010/0117277 A1* | 5/2010 | Ohta | B60G 13/18 267/140.14 |
| 2010/0117323 A1* | 5/2010 | Lundmark | B60G 21/0555 280/124.106 |

(56) References Cited

U.S. PATENT DOCUMENTS

| | | | | |
|---|---|---|---|---|
| 2010/0164311 A1* | 7/2010 | Mock | ................... | H02K 7/116 310/83 |
| 2010/0180708 A1* | 7/2010 | Kos | ................. | B25J 9/102 74/490.03 |
| 2010/0236849 A1* | 9/2010 | Wishart | ................ | B60K 7/0007 180/65.51 |
| 2010/0253110 A1* | 10/2010 | Yamada | ................... | B60N 2/62 296/65.08 |
| 2010/0320357 A1 | 12/2010 | Ummethala et al. | | |
| 2011/0114905 A1* | 5/2011 | Milicic | ................... | B66F 3/12 254/122 |
| 2011/0181069 A1* | 7/2011 | Kniffin | ................... | B60N 2/501 296/65.02 |
| 2011/0233364 A1* | 9/2011 | Breen | ................... | B60N 2/501 248/421 |
| 2011/0241391 A1* | 10/2011 | Lamparter | ............... | B60N 2/24 297/216.1 |
| 2011/0290978 A1 | 12/2011 | Keen | | |
| 2012/0153658 A1* | 6/2012 | Kanda | ................... | B60N 2/682 296/65.13 |
| 2012/0169099 A1* | 7/2012 | Horiguchi | .............. | B60N 2/307 297/314 |
| 2012/0241698 A1* | 9/2012 | Swasey | .................... | B66F 3/22 254/122 |
| 2012/0261963 A1* | 10/2012 | Heyer | ................... | B60N 2/164 297/313 |
| 2013/0092814 A1* | 4/2013 | Breen | ................... | B60N 2/506 248/584 |
| 2013/0127131 A1* | 5/2013 | Michel | ................. | B60G 11/183 280/124.106 |
| 2013/0154277 A1* | 6/2013 | Willems | ................. | B60G 13/14 290/1 C |
| 2013/0293975 A1* | 11/2013 | Englander | ............. | B60R 1/0612 359/872 |
| 2013/0300174 A1* | 11/2013 | Ito | ........................ | B60N 2/2252 297/354.1 |
| 2014/0232083 A1* | 8/2014 | Mohrlock | ............. | B60G 11/48 280/124.166 |
| 2014/0263911 A1* | 9/2014 | Parker | ................... | B60N 2/501 248/327 |
| 2015/0231942 A1* | 8/2015 | Trangbaek | ........... | F16F 15/022 267/195 |
| 2016/0039646 A1* | 2/2016 | Knapp | ..................... | B66F 3/46 254/89 R |
| 2016/0082870 A1* | 3/2016 | Fujita | .................... | B60N 2/501 248/561 |
| 2016/0153535 A1* | 6/2016 | Yang | ..................... | H02K 16/00 475/5 |
| 2016/0176326 A1* | 6/2016 | Catton | .................... | B60N 2/38 248/636 |
| 2016/0313140 A1* | 10/2016 | Pelka | ..................... | B60N 2/501 |
| 2018/0072189 A1* | 3/2018 | Plante | .................... | B60N 2/162 |
| 2020/0047642 A1* | 2/2020 | Han | ....................... | B60N 2/045 |
| 2020/0282552 A1* | 9/2020 | Klassen | ................... | H02K 1/17 |

FOREIGN PATENT DOCUMENTS

| | | | | |
|---|---|---|---|---|
| CN | 101454962 A | 6/2009 | | |
| DE | 10140461 A1 | 2/2003 | | |
| DE | 102009025493 A1 * | 1/2011 | ............. | B66F 7/065 |
| EP | 1184215 A2 | 3/2002 | | |
| EP | 1354731 A1 | 10/2003 | | |
| EP | 1426567 A1 | 6/2004 | | |
| EP | 1457645 B1 | 9/2004 | | |
| EP | 1582383 A1 | 10/2005 | | |
| EP | 1618292 B1 | 1/2006 | | |
| EP | 1818518 B1 | 8/2007 | | |
| EP | 1864854 A2 | 12/2007 | | |
| EP | 2098390 A1 | 9/2009 | | |
| EP | 2390133 A1 | 11/2011 | | |
| EP | 2 431 218 A1 | 3/2012 | | |
| EP | 3085579 A1 * | 10/2016 | ............. | B60N 2/16 |
| FR | 2578524 A1 * | 9/1986 | ............ | B66F 7/0608 |
| FR | 2761643 A1 * | 10/1998 | ............ | B60N 2/501 |
| GB | 562338 A | 6/1944 | | |
| GB | 1246392 A | 9/1971 | | |
| GB | 2333340 A | 7/1999 | | |
| JP | H06193676 A | 7/1994 | | |
| JP | H10-246268 A | 9/1998 | | |
| JP | 2001 142386 A | 5/2001 | | |
| JP | 2001142386 A | 5/2001 | | |
| JP | 1535705 A1 * | 6/2005 | ............ | B25J 9/1065 |
| JP | 2008-286642 A | 11/2008 | | |
| JP | 2009-006798 A | 1/2009 | | |
| JP | 2009-208589 A | 9/2009 | | |
| JP | 4406979 B2 | 2/2010 | | |
| WO | 9011841 A1 | 10/1990 | | |
| WO | 2003098073 A2 | 11/2003 | | |
| WO | 2006094213 A1 | 9/2006 | | |
| WO | WO 2009/116199 A1 | 9/2009 | | |
| WO | 2010007795 A1 | 1/2010 | | |
| WO | WO 2011/119365 A1 | 9/2011 | | |
| WO | WO-2012036212 A1 * | 3/2012 | ............... | B60N 2/06 |
| WO | WO-2013104437 A1 * | 7/2013 | ............ | F16F 7/1022 |
| WO | WO-2013105868 A1 * | 7/2013 | ............. | B60G 13/16 |

OTHER PUBLICATIONS

English Translation of Office Action dated Sep. 16, 2016 by the Japanese Patent Office for corresponding JP Application No. 2016-502304.
Office Action (English Translation) dated Sep. 29, 2016 by the Patent Office of the People's Republic of China for corresponding CN Application No. 201480013431X.
Noguchi, Shoichi; Transmission Device and Experimental Technique, Japan, Joint-stock company Kyoritsusya, May 28, 1937, p. 21, figure 28(a). [No English version available].
Hattori, Toshio; Applied Mechanics, Japan, Gihodo, Sep. 15, 1972, first edition, fourth printing, p. 138, 5D driving, (Figure 323) [No English version available].
JP Office Action dated Oct. 8, 2013 for JP2012-555214.
JP Office Action date Apr. 1, 2014 for JP2012-555214.
JP Office Action date Apr. 14, 2015 for JP2012-555214.
JP Office Action date Aug. 25, 2015 for JP2014-156577.
CN Office Action dated Jul. 31, 2014 for 201180016106.5.
International Search Report and Written Opinion dated Jul. 24, 2014 for International application No. PCT/US2014/026992.
Caterpillar Comfort Seats; 2003 Caterpillar.
International Search Report and Written Opinion dated Jun. 23, 2014 for International application No. PCT/US2014/027209.
Office Action (English Translation) dated Apr. 10, 2017 by the European Patent Office for corresponding EP Application No. 11710621.1.
Machine Translation of JP 2001142386 published May 25, 2001.
Moon, Francis C. The Reuleaux Collection of Kiinematic Mechanisms at Cornell University, American Society of Mechanical Engineers 2004, pp. 1-14.
http://common.wikimedia.org/wiki/Linkage_(mechanical), downloaded Mar. 30, 2010.
http://en.wikipedia.org/wiki/Linkage_(mechanical), Downloaded Mar. 30, 2010.
http://en.wikipedia.org/wiki/Peaucellier%E2%80%93Lipkin_linkage, Downloaded Mar. 30, 2010.
http://en.wikipedia.org/wiki/Chebyshev_linkage., Downloaded Mar. 30, 2010.
http://en.wikipedia.org/wiki/Hoekens_linkage., Downloaded Mar. 30, 2010.
http://en.wikipedia.org/wiki/Watt%27s_linkage, Downloaded Mar. 30, 2010.
Saha, Use of Hoeken's and Pantograph Mechnisms for Carpet Scrapping Operations, Published int he Proc. of the 11th Nat. Conf. on Machines and Mechanisms, Dec.18-19, IIT Delhi, pp. 732-738.
International Search Report and Written Opinion dated Jun. 27, 2011 for PCT/US2011/028451.

(56) References Cited

OTHER PUBLICATIONS

Nobukazu Hoshi & Atsuo Kawamura, Experimental Discussion on the Permanent Magnet Type Anti-Directional; Twin Rotary Motor Drive for Electric Vehicle, pp. 425-429.
First Chinese Office Action dated Dec. 18, 2013 for Chinese Patent Application No. 201180016106.5.
Office Action dated Aug. 2, 2016 for corresponding Japanese Patent Application No. 2014-156577.

* cited by examiner

ROTARY ACTUATOR DRIVEN VIBRATION ISOLATION

CROSS-REFERENCE TO RELATED APPLICATIONS

Background

Vibration isolation systems attempt to isolate a payload from a vibration disturbance. Vibration isolation systems may be passive, semi active, or fully active. A fully active vibration isolation system employs a source capable of exerting a force of arbitrary magnitude and phase, absent any disturbance, as part of the isolation system. Some applications for vibration isolations systems are ground vehicles, watercraft or air craft. Vehicles such as passenger cars, long haul trucks, construction equipment and the like typically employ some type of suspension system as a vibration isolation system in order to isolate the vehicle occupant(s) from vibration induced by disturbances encountered by the vehicle as it travels along a path (where the path may be on and/or off road). In some vehicles, however, the vehicle suspension may not be adequate to effectively isolate vehicle occupant(s) from the road induced disturbances. This may be especially true in vehicles such as the tractor of semi-trailer truck, which may have a "harsher" suspension than a passenger vehicle and which drivers may occupy for long periods of time. Vehicles such as these may have a second suspension, to control relative motion between the occupant's seat and the vehicle cabin. The seat suspension may be passive, semi-active, or may be fully active.

SUMMARY

In one aspect, a vibration isolation system for isolating a suspended platform from a base subject to a vibration input includes an exoskeleton for supporting the suspended platform relative to the base over a range of travel, a rotary actuator comprising first and second rotors wherein both the first and second rotors are free to rotate relative to the exoskeleton, wherein the rotary actuator is free to translate relative to the suspended platform and the vibration isolation system base.

Embodiments may include one or more of the following features. A drive mechanism separate from the exoskeleton for applying output force from the rotary actuator between the suspended platform and the base. The rotary actuator is offset to the side of the vibration isolation system base and the drive mechanism is arranged to drive the suspended platform at or near the center of gravity of the suspended platform. The rotary actuator is inertially coupled to the exoskeleton at a point intermediate between the connection of the exoskeleton to the suspended platform and the connection of the exoskeleton to the base. The relative rotation of the first and second rotors with respect to each other is less than one full revolution for displacement of the suspended platform relative to the base over the entire range of travel. The drive mechanism includes pivoting links, at least a first end of each pivoting link of the drive mechanism that is coupled to the rotary actuator is coupled to the rotary actuator via a rotary bearing. The pivoting links are preloaded. The rotary bearings in each pivoting link include a pair of rotary bearings, and the preload is applied by placing a compliant element between the pair of rotary bearings. The pivoting links are preloaded by a spring element that also offloads the static weight of the vibration isolation platform from the rotary actuator. The pivoting links include a first pair of pivoting links held in compression and a second pair of pivoting links held in tension. The pivoting links held in compression are oriented at different angles relative the pivoting links that are held in tension. The drive mechanism includes cams and cam followers. The exoskeleton includes a pair of scissors mechanisms where each scissors mechanism has a central pivot point, wherein the rotary actuator is inertially coupled to a central shaft that is coupled between the central pivot points of the two scissors mechanisms. The exoskeleton comprises a first scissors mechanism comprising first and second main links of unequal length and first and second secondary links, where the first and second main links are pivotably coupled to each other at an intermediate point; a second scissors mechanism comprising third and fourth main links of unequal length, and third and fourth secondary links, where the third and fourth main links are pivotably coupled to each other at a second intermediate point; wherein the first and second scissors mechanisms support the suspended platform relative to the base over an intended range of travel wherein the first and second main links pass through parallel as the vibration isolation system is displaced over the intended range of travel and the third and fourth main links pass through parallel as the vibration isolation system is displaced over the intended range of travel. The first, second, third and fourth secondary links are oriented in the same direction. The first, second, third and fourth secondary links are parallel to each other. The first, second, third, and fourth secondary links are of equal length. The rotary actuator is inertially coupled to a central shaft that is coupled between the first and second intermediate points of the two scissors mechanisms. Flexible ribbon cables provide electrical signals to and accept electrical signals from the rotary actuator. The flexible ribbon cables wrap around the outside of the rotary actuator.

In another aspect, a vibration isolation system for isolating a suspended platform from a base subject to a vibration input includes an exoskeleton for supporting the suspended platform relative to the base over a range of travel, a rotary actuator including first and second rotors wherein both the first and second rotors are free to rotate relative to the exoskeleton wherein the rotary actuator is inertially coupled to one of the suspended platform and the base; and a drive mechanism, separate from the exoskeleton, for coupling output force from both the first and second rotors of the rotary actuator to the one of the suspended platform and the base to which the rotary actuator is not inertially coupled.

Embodiments may include any of the above features and/or the following. The drive mechanism comprises pivoting links. The pivoting links are preloaded. The relative rotation of the first rotor with respect to the second rotor is less than one full turn for displacement of the suspended platform relative to the base over its entire intended range of travel.

In another aspect a vibration isolation system for isolating a suspended platform from a base subject to a vibration input includes an exoskeleton for supporting the suspended platform above the base, a rotary actuator including first and second rotors wherein the relative rotation of the first and second rotors with respect to each other is less than one full revolution for the full range of travel of the suspended platform relative to the base, and a drive mechanism, separate from the exoskeleton, for coupling output force from both the first and second rotors of the rotary actuator to the one of the suspended platform and the base to which the rotary actuator is not inertially coupled.

Embodiments may include any of the above features and/or the following. The drive mechanism includes pivoting links. The pivoting links are preloaded. The relative rotation of the first rotor with respect to the second rotor is less than one full turn for displacement of the suspended platform relative to the base over its entire intended range of travel.

In another aspect a vibration isolation system for isolating a suspended platform from a base subject to a vibration input includes an exoskeleton for supporting the suspended platform above the base, a rotary actuator comprising first and second rotors wherein the relative rotation of the first and second rotors with respect to each other is less than one full revolution for the full range of travel of the suspended platform relative to the base, and a drive mechanism separate from the exoskeleton for applying output force from the rotary actuator to at least one of the suspended platform and the base.

Embodiments may include any of the above features and/or the following. The drive mechanism comprises pivoting links. The pivoting links are attached to the rotary actuator, suspended platform and vibration isolation system base via rotary bearings. The pivoting links are attached to the rotary actuator via rotary bearings and are attached to the suspended platform and vibration isolation system base via compliant bushings. The first rotor is inertially fixed to a mechanical ground reference selected to be one of the vibration isolation system base and the suspended platform. The first rotor is rotationally fixed relative to the mechanical ground reference. The first rotor is rotationally free relative to the mechanical ground reference. The first and second rotors are rotationally free relative to a mechanical ground reference selected to be one of the vibration isolation system base and the suspended platform.

In another aspect a vibration isolation system for isolating a suspended platform from a base subject to a vibration input includes an exoskeleton for supporting the suspended platform above the base, and a rotary actuator for outputting a force to displace the suspended platform relative to the base over a range of travel, the rotary actuator comprising first and second rotors wherein the relative rotation of the first and second rotors with respect to each other is less than one full revolution for displacement of the suspended platform relative to the base over the entire range of travel, wherein the rotary actuator is free to translate relative to the suspended platform and the vibration isolation system base.

Embodiments may include any of the above features and/or the following. The rotary actuator is inertially coupled to a portion of the exoskeleton intermediate between the connection of the exoskeleton to the suspended platform and the connection of the exoskeleton to the vibration isolation system base. Both the first and second rotors of the rotary actuator are free to rotate relative to the exoskeleton. The exoskeleton comprises a pair of scissors mechanisms. Each scissors mechanism has a central pivot point, wherein the rotary actuator is inertially coupled between the central pivot points of the two scissors mechanisms.

In another aspect a vibration isolation system for isolating a suspended platform from a base subject to a vibration input includes an exoskeleton for supporting the suspended platform above the base, and a rotary actuator for outputting a force to displace the suspended platform relative to the base over a range of travel, the rotary actuator comprising first and second rotors wherein the relative rotation of the first and second rotors with respect to each other is less than one full revolution for displacement of the suspended platform relative to the base over the entire range of travel, wherein the rotary actuator is free to translate relative to the suspended platform and the vibration isolation system base.

BRIEF DESCRIPTION OF THE DRAWINGS

FIG. 4b is a perspective view of a scissors exoskeleton mechanism that includes the omitted portions of the exoskeleton frame of FIG. 4a.

DETAILED DESCRIPTION

The present disclosure is directed to active vibration isolation systems. The active vibration isolation systems will be described in terms of providing isolation to a plant (which will encompass a suspended platform on which a payload resides, but may encompass other elements also) from a vibration input applied to a base which the vibration isolation system is coupled. The active vibration system applies controlled forces between the base and suspended platform in order to provide vibration isolation to the suspended platform on which the payload resides. Many of the embodiments disclosed herein will discuss active vibration systems as applied to a vehicle seat. However, it should be understood that the vibration isolation systems described are not limited to application in a vehicle seat. Any application in which it is desired to isolate a payload from some vibration input is contemplated herein.

The isolated plant encompasses the entire structure that is isolated from the input vibration. In the case of an active seat, the seat top frame, cushions, armrests, etc. are all part of the suspended plant. Additionally, an occupant of the actively suspended seat will also become part of the plant (since it is the occupant we are most interested in isolating, in this example the occupant would be the payload). The embodiments to be further described are related to the arrangements of components of the active suspension system which are located between the structure that is vibrating and the payload which it is desired to isolate from the vibration.

Figure 1:
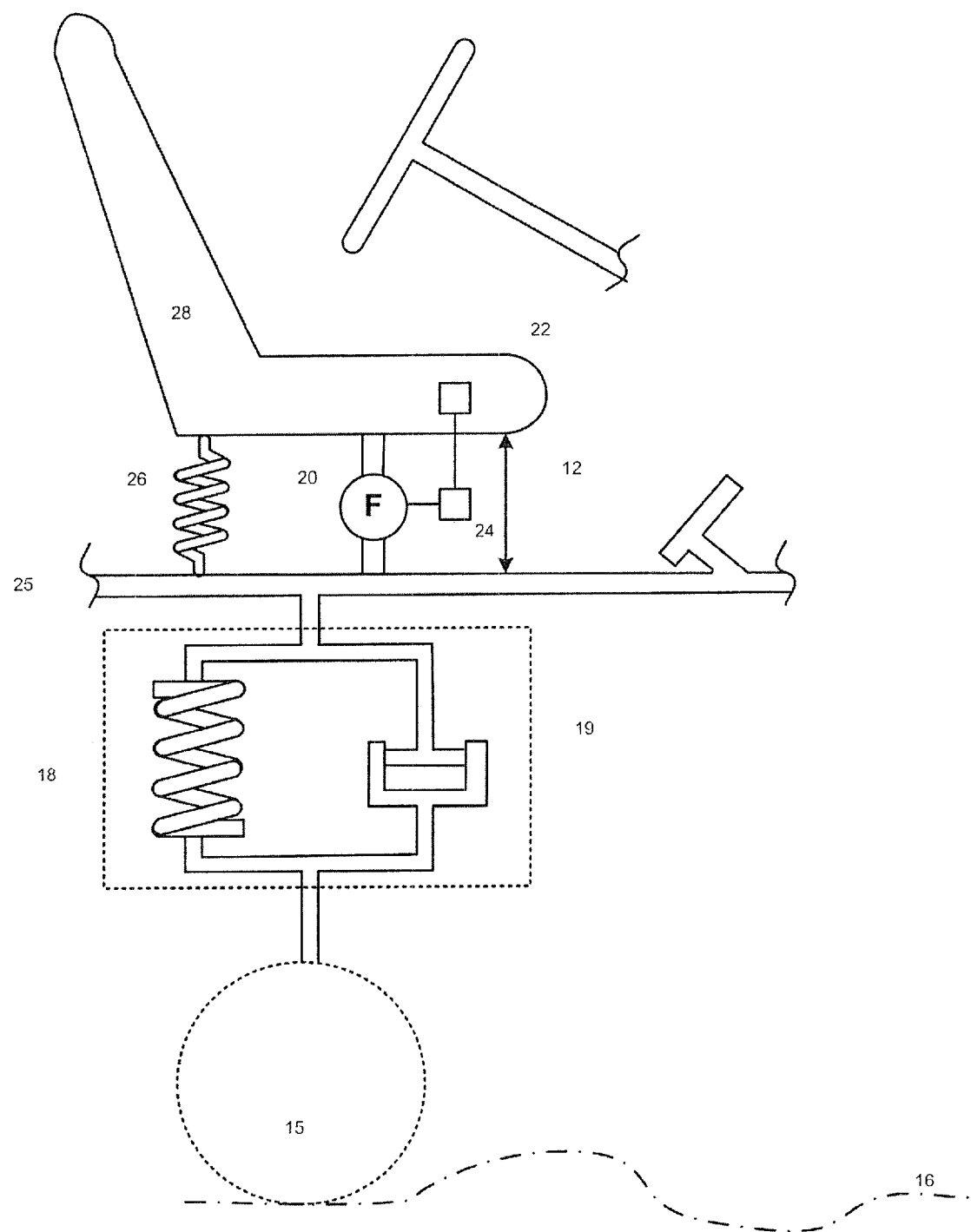
FIG. 1 is a schematic view of a vehicle with a passive vehicle suspension and an active vibration isolation seat system.

In the suspension of FIG. 1, suspension 12 is an active seat suspension including a force source 20, a sensor 22, and a controller 24. Some active suspensions may have multiple sensors, and possibly even multiple force sources. The suspension 12 may also have a spring 26 to support the static weight of the seat 28. Spring 26 may be a variable spring with a controllable spring constant or be a spring with provision to apply a controllable pre-load. In the example of FIG. 1, the force source 20 is inertially coupled to the vehicle floor 25.

In operation, vehicle wheel 15 traverses disturbances as it traverses path 16. The disturbances along the path cause forces to be applied to the vehicle wheel, which are in turn communicated to the vehicle floor 25 through vehicle suspension spring 18 and damper 19. The vehicle body which rests upon vehicle suspension elements 18 and 19 (note that only one wheel of a vehicle is shown) is typically referred to as the sprung mass, and the mass of the wheel assembly is typically referred to as the unsprung mass. Motion of the unsprung mass imparts forces into the suspension elements which in turn imparts forces into the sprung mass. Seat suspension 12 is used to isolate seat 28 from motion of the sprung vehicle mass.

Sensor 22 detects a quantity related to vertical motion of the seat 28 (such as vertical acceleration, vertical displacement, or vertical velocity). The output of sensor 22 (and other sensors if present) is/are provided as input data to the controller 24. Based on the data supplied to it, the controller 24 determines what output force should be exerted by the force source 20 in order to control motion of the seat 28, and controller 24 issues commands that cause force source 20 to exert the needed force. The above explanation is a simplified discussion of the functioning of an active closed loop vibration control system. An active, closed loop vibration control system suitable for use as seat suspension 12 is described in detail in U.S. Pat. No. 7,983,813, "Active Suspending", to Umethala et al., which is herein incorporated by reference in its entirety.

In U.S. Pat. No. 7,983,813, the force source disclosed was a linear actuator with a moving magnet armature. In some applications, a linear actuator may not be the optimal choice. For example, for the same amount of travel required, it may be desirable to employ a force source that can fit within a smaller physical envelope than a linear actuator can fit within. Additionally, in applications where high efficiency and/or compactness are desired, a rotary actuator may be a better choice. In a linear actuator, portions of the linear actuator armature that extend outside of the stator envelope do not contribute significantly to the force output of the actuator.

Embodiments described herein benefit from particular arrangements of the elements of the vibration control system, as will be described in more detail. Embodiments disclosed herein employ a rotary actuator. Use of conventional transmission mechanisms such as ball nuts and ball screws, planetary gear heads, etc. has been avoided. Such conventional transmissions can provide the useful benefit of allowing the size of a motor for a particular application to be reduced by introducing a motion ratio where multiple revolutions of the motor are translated into a different number of revolutions of the transmission output (generally more revolutions of the motor are transformed into fewer rotations of the transmission output to provide a force amplification factor allowing the motor size to be reduced for a desired output force). However, it is desirable to position a motion sensor near the point at which the force is applied to the controlled element (i.e. the suspended platform which is part of the suspended plant). The presence of a transmission separates the point of application of the force output of the force source from the suspended platform to be controlled (the transmission is disposed between the force source and the suspended platform portion of the plant). Any irregularities in the transmission, such as backlash, slippage, friction, stiction and the like, may introduce the possibility of instabilities in the control loop. Generally, it is very difficult to avoid lash, noise, and wear in a transmission mechanism, especially over long periods of operation as components wear, lubrication degrades, etc. By avoiding the use of a conventional transmission mechanism within the closed control loop, these difficulties are avoided.

It is desirable for there to be as direct a coupling as practical between the force source output and the suspended plant, in at least the degree of freedom of motion the vibration isolation system is arranged to control. More specifically, it is desirable to avoid routing the primary force output from the vibration isolation system through a secondary support structure such as an exoskeleton (examples of exoskeletons are described later in more detail, and may encompass 4 bar links, scissors mechanisms, telescoping systems, linear bearing systems, and the like) before it is applied to the suspended plant. We will refer to coupling a rotary actuator force source in an active vibration isolation system directly between a plant to be isolated and an isolation system base such that it is not routed through an exoskeleton, in the controlled motion degree of freedom, as direct drive. Mechanisms used to provide direct drive coupling will be referred to as direct drive mechanisms. Some examples of direct drive mechanisms are pivoting links and/or cam/follower structures, which will be described in more detail in subsequent sections.

In some embodiments, the direct drive mechanism employs pivoting links to transmit force from the force source to plant (and/or between the force source and the vibration isolation system base). In general, the angular displacement of the pivoting link relative to the location on the force source where it couples will be relatively large. Coupling the link to the force source will preferably be accomplished using a rotary bearing that does not constrain relative rotation of the link end relative to its connection location to the force source, but does constrain translation of the link relative to its connection location to the force source.

In general, the angular displacement of the link end that connects to the suspended plant and/or to the vibration isolation system base sees less angular displacement relative to its respective connection location to the plant (and/or to the mechanical ground) than the first link connection point sees relative to the force source connection location (as described above). In some embodiments, this connection of the pivoting link to the plant (and/or the vibration isolation system base) is accomplished with a rotary bearing also, as the first connection point to the force source is accomplished. In some embodiment, since the relative angular displacement requirements are lessened, the rotary bearing can be replaced by a rotationally compliant elastomeric bushing or a flexure. The bushing or flexure should be rotationally compliant to allow the required angular displacement of the link end relative to the plant (and/or the vibration isolation system base) connection point, while substantially constraining translation of the link end relative to its connection point location to the plant (and/or to the vibration isolation system base).

The direct drive mechanisms described above employ elements to connect the link ends to the force source and to the plant and/or vibration isolation system base as needed that allow the required relative rotation of the link ends to their respective connection points to the force source, plant and/or vibration isolation system base, while constraining translation motion of the link ends relative to their respective connection points. Rotary bearings, rotationally compliant bushings, flexures, or any other known mechanism that can accommodate the necessary relative rotation while substantially constraining relative translation motion can be used as part of the direct drive mechanism, and the disclosure herein is not limited to the use of any particular connection mechanism.

In the embodiments described herein, both a drive mechanism and a separate support mechanism (which will be referred to also as an exoskeleton) are used. There are a number of benefits to such an arrangement. As described earlier, the drive mechanism is configured such that it directly couples the force output from the rotary actuator to the suspended platform (in the general case, the coupling is from the rotary actuator to the plant. In the example of an actively suspended seat, the coupling is between the rotary actuator and the frame of the seat top, or to a platform to which the seat top frame is mounted). A motion sensor can be located on the suspended platform at or near the location the force output of the force source is coupled to the suspended platform. When used in a closed loop vibration control system, locating a motion sensor at or near the force application point on the plant is advantageous, as the effects of bending modes and other extraneous vibrations of other plant structures can be minimized. Such an arrangement improves stability of the closed loop control system. Additional sensors may be located elsewhere as needed.

Use of a separate exoskeleton relieves the direct drive mechanism from having to resist extraneous loads that may arise in the system (side loads, bending moments, etc.) By offloading the requirement of resisting extraneous loads to the exoskeleton, it becomes easier to design direct drive mechanisms that minimize backlash, slippage, friction, etc. For example, for a pivoting link direct drive mechanism, use of the exoskeleton minimizes bending loads that bearings in the pivoting link must withstand. Minimizing bending, torsion, etc. in bearings can significantly increase their useful service life, lower friction, and allow the use of less expensive bearings in the application.

The exoskeleton is configured to resist extraneous forces (other than in the controlled motion degree of freedom), so the drive mechanism is relieved of the need to resist such forces. This simplifies the design of the force source and drive linkage, and increases reliability of the system. Additionally, the control loop is not closed through the exoskeleton (support structure), which enhances isolation system stability.

For the case where the vibration isolation system is configured to control motion in a desired degree of freedom axis, it is desirable, but not required, for the exoskeleton to constrain motion of the plant with respect to the base of the vibration isolation system to be rectilinear along the controlled axis. In an actively suspended seat application, it is desirable, though not necessary, for motion of the seat top to be rectilinear with respect to the vehicle floor. A scissors mechanism is one embodiment of an exoskeleton suitable for use with the various embodiments described herein. A scissors mechanism can provide rectilinear, or close to rectilinear motion. Conventional scissors mechanisms typically use a sliding surface or linear bearing, which can introduce problems such as increased friction, rattling, wear, backlash controllability problems, etc. in the case of a sliding surface or additional cost (in the case of linear bearings). One embodiment of a scissors mechanism using only pivoting links has particular benefit which will be described in more detail in a subsequent section. Other exoskeleton structures, such as telescoping structures, linear bearings, or other rectilinear suspension mechanisms as are known in the art may also be used.

Some useful exoskeleton mechanisms constrain motion to be curvilinear. Various pivoting link mechanisms known in the art, such as four bar links, may be used. If an exoskeleton that constrains motion to be curvilinear is used, the drive mechanism must also be configured to accommodate motion in one or more other degrees of freedom, in addition to the controlled motion axis degree of freedom. In a 4 bar link exoskeleton no sliding surfaces or linear bearings are needed, which provides a cost and reliability benefit. Rotary bearings generally are less expensive, more reliable, and suffer less from lash, stiction, and other non-linearities as compared to linear bearings or sliding surfaces. However, allowing curvilinear motion, as results when a mechanism such as a 4 bar link is used, results in introduction of motion in another degree of freedom (fore-aft or lateral when the 4 bar link is configured for a primary motion axis that is vertical). Introduction of motion in the additional degree of freedom may be problematic in some applications.

Conventional rotary actuators are typically described as having a rotor component and a stator component, where the rotor rotates relative to the stator. In typical applications, the stator is fixed relative to a mechanical reference (both inertially and rotationally) and the rotor rotates relative to the fixed stator. However, this is a somewhat arbitrary and limiting description of rotary actuators. For purposes of this disclosure, rather than specifically identifying a rotor and stator, we will describe inner and outer rotors. The rotary actuator allows there to be relative rotation between the inner and outer rotors. Various embodiments will be described that couple one or both of the inner and outer rotors in various manners to various portions of the vibration isolation system. In some embodiments, one of the rotors may be rotationally fixed relative to a mechanical ground reference (such as the vibration isolation system base or the suspended platform). In some embodiments, both rotors will be free to rotate relative to the mechanical ground reference. In some embodiments, the relative rotation of the inner rotor with respect to the outer rotor of the rotary actuator is limited to be less than one complete revolution, for the entire range of travel of the suspended platform relative to the vibration isolation system base. In some embodiments the relative rotation of the inner rotor with respect to the mechanical ground reference and the relative rotation of the outer rotor with respect to the mechanical ground reference are each limited to be less than one complete revolution, for the entire range of travel of the suspended platform relative to the vibration isolation system base.

There are numerous types of rotary actuators, and the invention is not limited to use of any particular type of rotary actuator. Rotary actuators can be DC rotating machines or AC rotating machines. They may use permanent magnets or may be induction or switched reluctance machines that do not rely on permanent magnets. Rotary actuators may use rare earth permanent magnets such as NdFeB, or may use less expensive ceramic magnets, or no magnets. Rotary actuators may be hydraulic or pneumatic. The embodiments disclosed herein are not limited in any way as regards the physical principles employed to create relative motion between the inner and outer rotors, and any known rotary actuator may be used.

There are a number of ways in which a rotary actuator can be mounted with respect to the base and the plant in an active vibration isolation system, and there are a number of ways in which the relative angular displacement of the inner rotor with respect to the outer rotor can be used to provide the output force between the vibration isolation system base and the plant. FIGS. 2a-2f, and 3a-3c schematically show various embodiments of an active vibration isolation system using a rotary actuator. These figures describe arrangement of the rotary actuator, direct drive mechanism, vibration isolation system base and suspended platform (plant). The exoskeleton and details of the control system have been omitted for clarity.

Figure 2A:
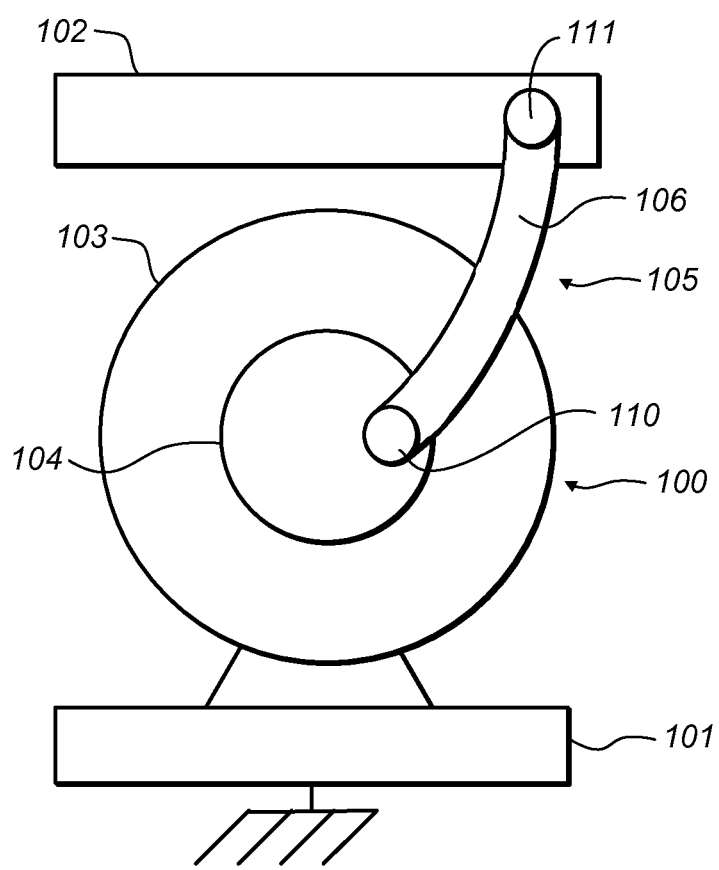
FIG. 2a is a schematic view of one embodiment of an active vibration isolation system.
Figure 2B:
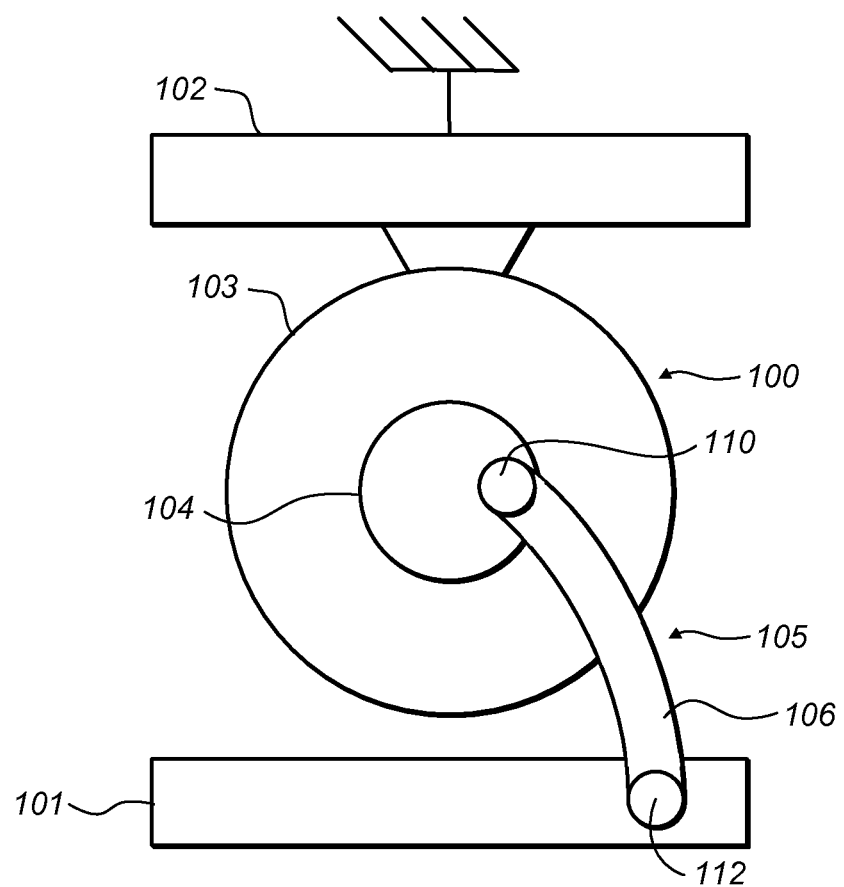
FIG. 2b is a schematic view of one embodiment of another active vibration isolation system.

In FIG. 2a, the rotary actuator 100 is inertially fixed to a mechanical ground reference. In this application, the mechanical ground reference refers to a selected arbitrary mechanical reference point. The mechanical ground reference can be selected to be virtually any point within the system (or even a point external to the system such as the earth). However, in the embodiments disclosed herein the mechanical ground reference will typically be chosen to be either the vibration isolation system base or the suspended platform. In FIG. 2a the mechanical ground reference is chosen to be the vibration isolation system base 101. In FIG. 2b, the mechanical ground reference is chosen to be the suspended platform 102. By inertially fixed (to the mechanical ground), we mean that the entire mass of rotary actuator 100 translates in space relative to the earth in the same manner as the mechanical ground reference to which it is inertially coupled. In FIG. 2a, the rotary actuator 100 moves with the base 101. In FIG. 2b, the rotary actuator 100 moves with the suspended platform 102 and the mass of rotary actuator 100 becomes part of the moving mass of the suspended platform 102.

Figure 3A:
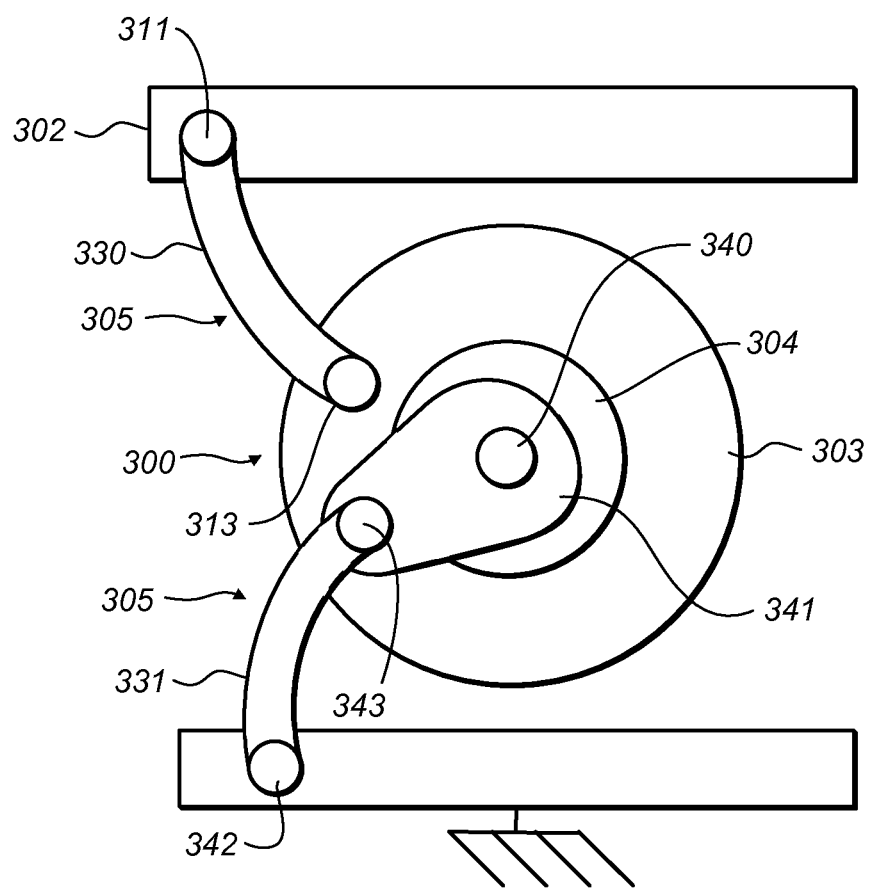
FIG. 3a is a schematic view of one embodiment of another active vibration isolation system.
Figure 3B:
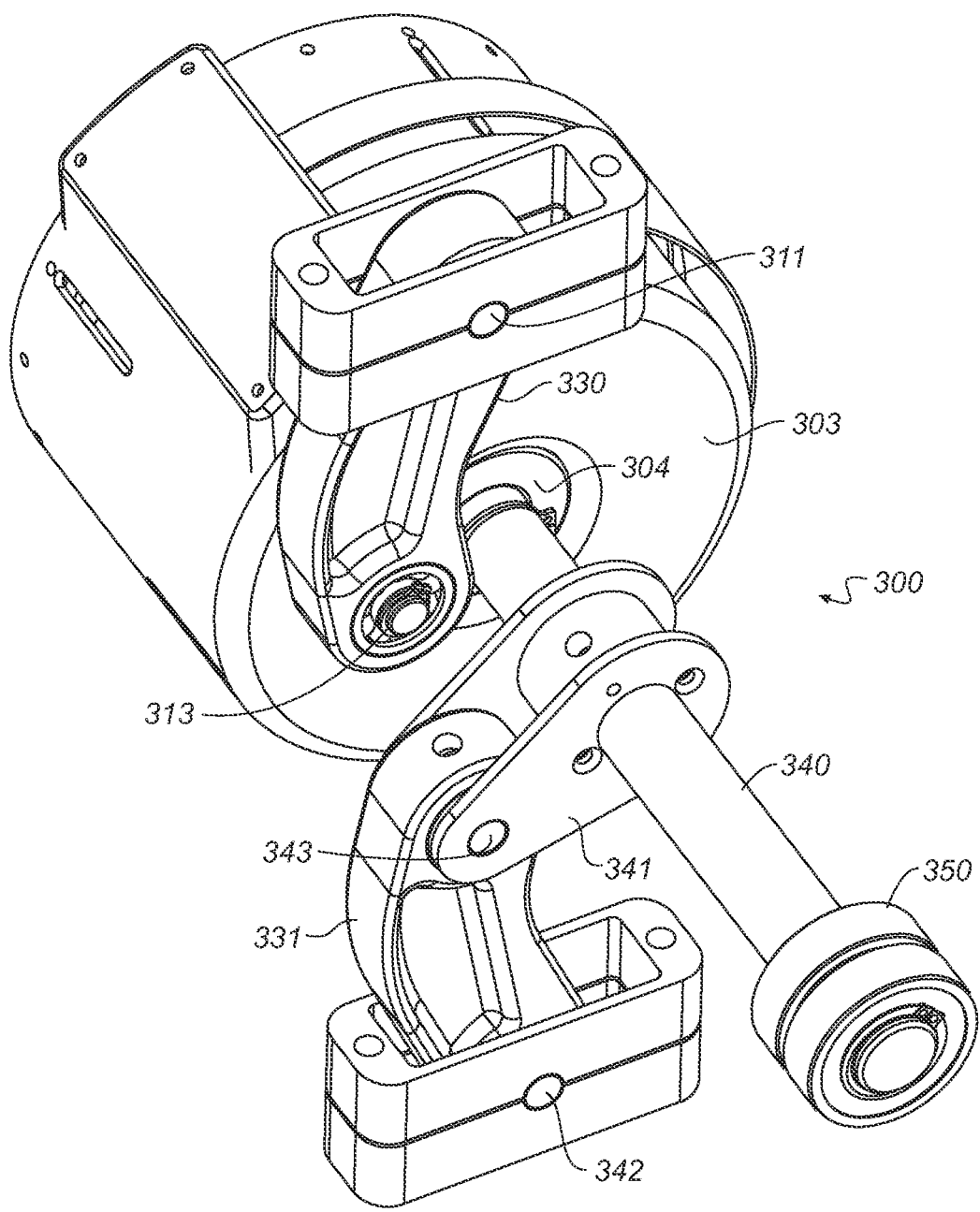
FIG. 3b is a schematic view of one embodiment of another active vibration isolation system.

In some embodiments, the rotary actuator 100 is inertially coupled to some part of the active suspension system other than the base 101 or the suspended platform 102. In this configuration, the rotary actuator 100 translates with respect to both the base 101 and the suspended platform 102. We refer to this configuration as a flying actuator. These configurations are shown in FIGS. 3a-3b, and will be described in more detail below.

In some embodiments, one of the inner rotor and outer rotor of the rotary actuator is fixed rotationally relative to a mechanical ground reference, and the other of the inner rotor and outer rotor can rotate relative to the mechanical ground. In FIG. 2a, outer rotor 103 of the rotary actuator 100 is rotationally fixed (as well as inertially fixed) with respect to the mechanical ground (base 101). The inner rotor 104 can rotate relative to the mechanical ground, and relative to the suspended platform 102. A direct drive mechanism 105 couples the inner rotor 104 to the suspended platform 102.

In FIG. 2a, the direct drive mechanism shown is a pivoting link mechanism, where rigid link 106 is coupled to the inner rotor 104 through rotary bearing 110 and is also coupled to the suspended platform 102 via a second rotary bearing 111. Other direct drive mechanisms, such as a cam and cam follower, may also be used here in place of the rotary link direct drive mechanism In the embodiment of FIG. 2b, the rotary actuator is inertially fixed to the suspended platform 102. The outer rotor 103 is rotationally fixed relative to the suspended platform 102, which in this embodiment has been chosen to be the mechanical ground reference. The inner rotor 104 can rotate relative to the mechanical ground, and relative to the base 101. A direct drive mechanism 105 couples the inner rotor 104 to the base 101. Direct drive mechanism 105 incorporates rigid link 106 which is coupled to the inner rotor 104 through rotary bearing 110 and is also coupled to the vibration isolation system base 101 through rotary bearing 112.

Figure 2C:
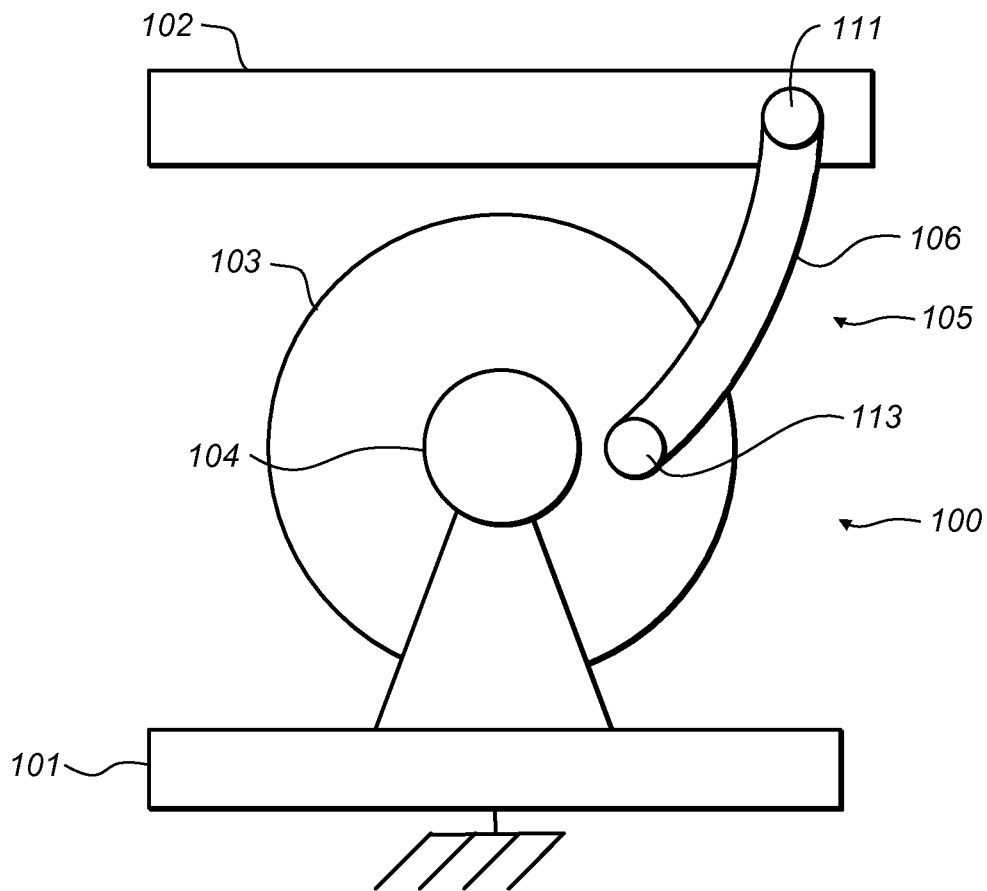
FIG. 2c is a schematic view of one embodiment of another active vibration isolation system.

In the embodiment of FIG. 2c the rotary actuator inner rotor 104 is inertially and rotationally fixed relative to the mechanical ground which is chosen to be the base 101 and the outer rotor 103 is allowed to rotate with respect to the mechanical ground. The outer rotor 103 is coupled to the suspended platform 102 via direct drive mechanism 105. Direct drive mechanism 105 incorporates a rigid link 106. The rigid link 106 is coupled to the outer rotor 103 via a first rotary bearing 113 and is coupled to the suspended platform 102 via a second rotary bearing 111.

Figure 2D:
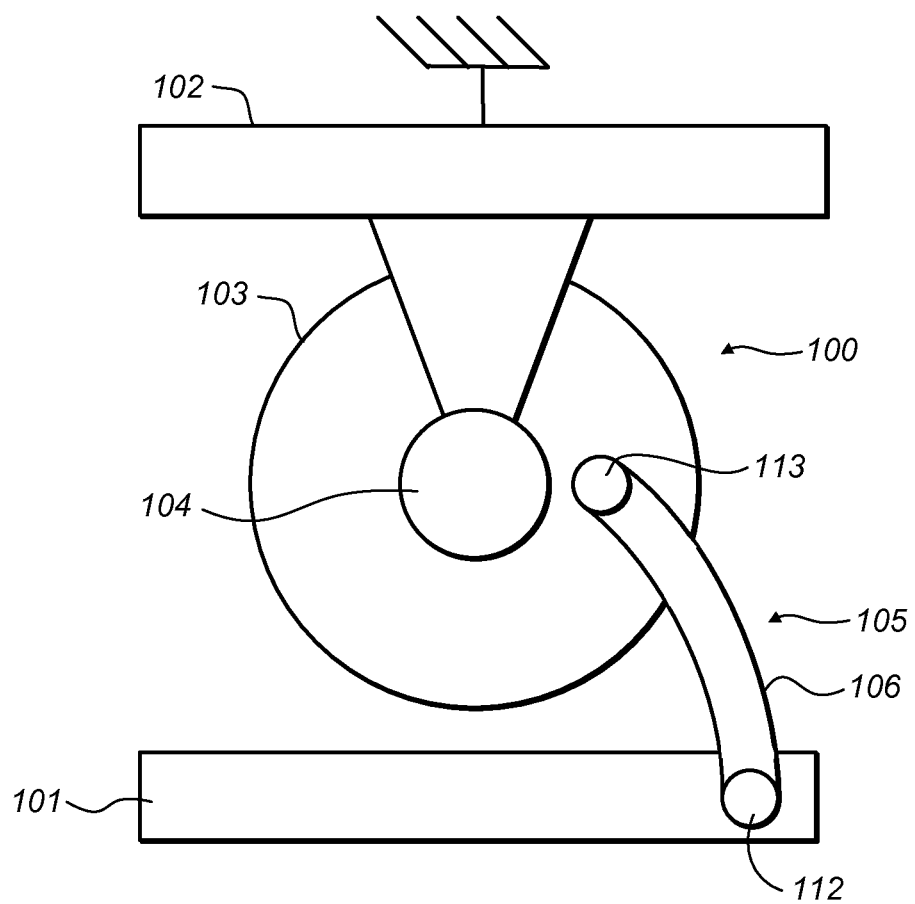
FIG. 2d is a schematic view of one embodiment of another active vibration isolation system.

In the embodiment of FIG. 2d, the inner rotor 104 is inertially fixed and rotationally fixed relative to the suspended platform 102 which has been chosen as the mechanical ground. Direct drive mechanism 105 couples the outer rotor 103 to the vibration isolation system base 101. Direct drive mechanism 105 incorporates rigid link 106, which is rotationally coupled to the outer rotor 103 through rotary bearing 113 and is rotationally coupled to the vibration isolation system base 101 through rotary bearing 112.

Figure 2E:
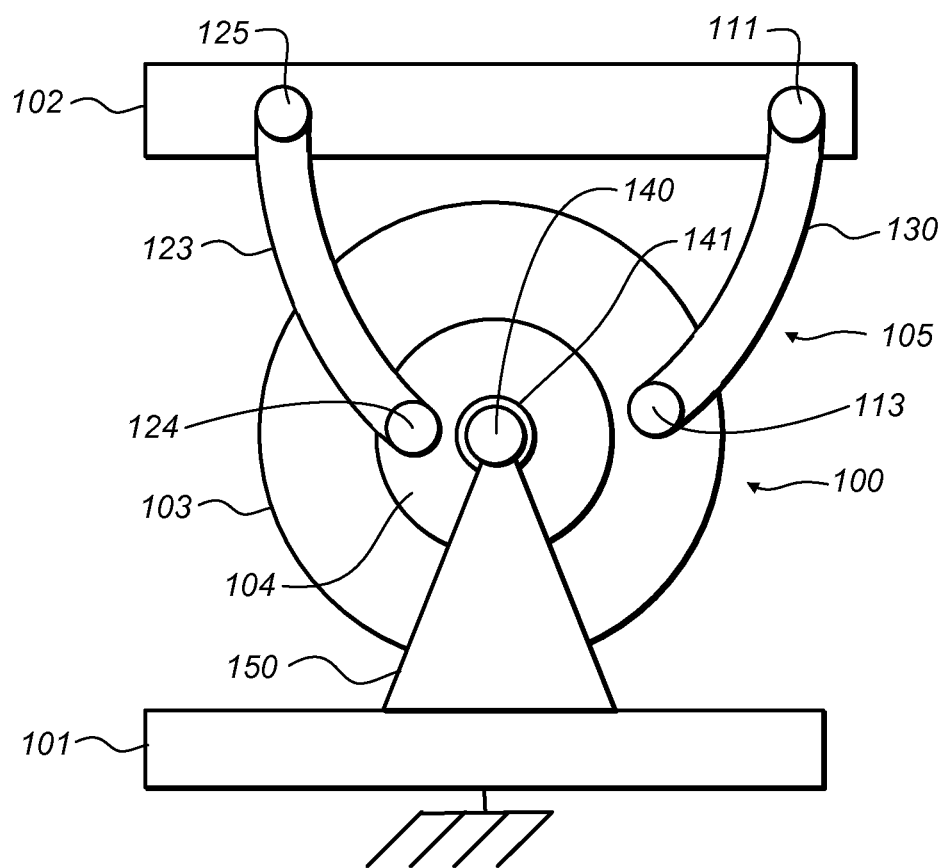
FIG. 2e is a schematic view of one embodiment of another active vibration isolation system.

In some embodiments it is possible to allow both the inner rotor 104 and the outer rotor 103 to rotate relative to both the base 101 and the suspended platform 102. In the embodiment of FIG. 2e the rotary actuator 100 is inertially coupled to the mechanical ground, which in this embodiment is the base 101. Both the inner rotor 104 and outer rotor 103 are free to rotate relative to both the base 101 and the suspended platform 102. Unlike previous embodiments where one of either the inner rotor 104 or outer rotor 103 was rotationally fixed relative to the mechanical ground, in this embodiment neither the inner rotor 104 nor outer rotor 103 are rotationally fixed relative to the mechanical ground. Embodiments where both the inner rotor and outer rotor are free to rotate relative to the mechanical ground are referred to herein as doubly acting. In general, in doubly acting embodiments, the inner and outer rotors rotate in opposite directions relative to each other.

Figure 2F:
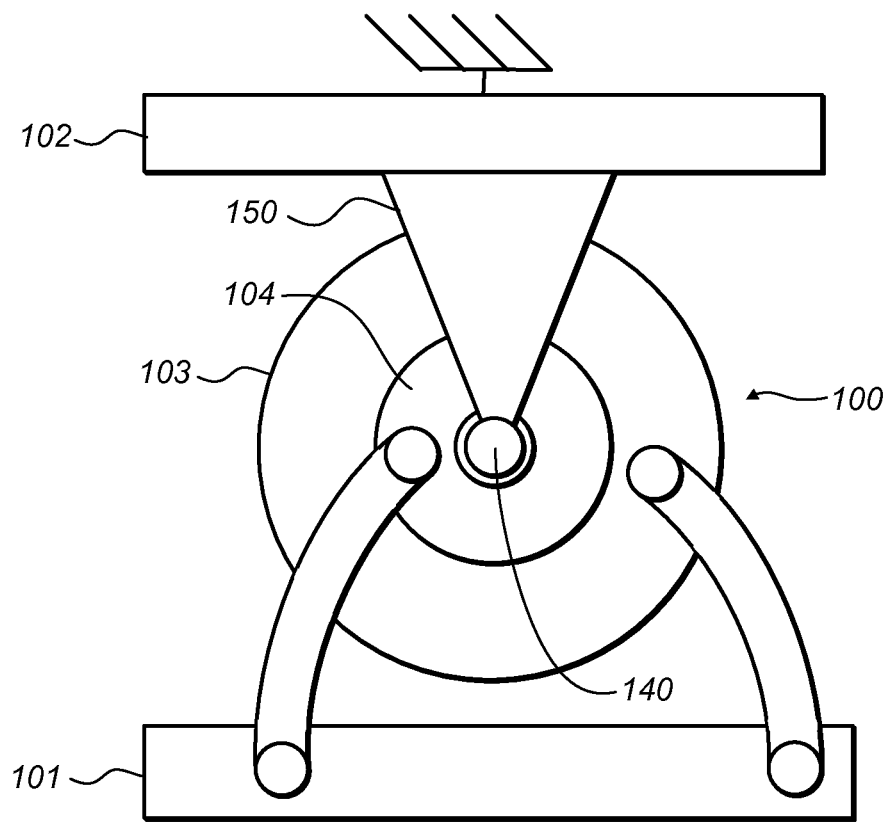
FIG. 2f is a schematic view of one embodiment of another active vibration isolation system.

A first rigid link 123 is coupled to the inner rotor 104 through a first rotary bearing 124 and is coupled to the suspended platform 102 via a second rotary bearing 125. A second rigid link 130 is coupled to the outer rotor 103 via a $3^{rd}$ rotary bearing 113 and is coupled to the suspended platform 102 via a $4^{th}$ rotary bearing 111. Additionally, a central shaft 140 extending through the rotary actuator is fixed to the inner rotor 104 and is coupled to an actuator mount 150 through a $5^{th}$ rotary bearing 141. Actuator mount 150 is fixed to (and therefore also inertially fixed to) the vibration isolation system base, which has been chosen to be the mechanical ground. In FIGS. 2e and 2f, only a single actuator mount 150 is shown. However, in practice the central shaft extends through the motor and couples to actuator mounts located on either side of the motor. In the embodiments shown in FIGS. 2e and 2f, the central shaft is fixed to the inner rotor and is rotationally coupled to the actuator mount(s). A practical benefit of fixing the central shaft to the inner rotor is that the central shaft can then be used as a mounting point for a crank arm for coupling the direct drive link to the inner rotor, which provides packaging flexibility. Alternatively, the central shaft could have been fixed to the actuator mounts and rotationally coupled to the inner rotor through bearings.

FIG. 2f shows another embodiment which is substantially similar to the embodiment of FIG. 2e. It will not be described in detail, other than to mention that the mechanical ground is chosen to be the suspended platform, rather than the base as in FIG. 2e.

In a doubly acting rotary actuator arrangement, it is desirable but not required for a particular angular displacement of the outer rotor with respect to the mechanical ground to correspond to a displacement of the suspended platform with respect to the base, and for the same angular displacement of the inner rotor with respect to the mechanical ground to correspond to the same displacement of the suspended platform with respect to the base. This can be done by employing a crank arm of a desired radius connected to the rotor. A crank pin that is the connection point between a direct drive link and the rotor can be located at the end of a crank arm of the desired length. Use of a crank arm 341 to accomplish this is shown in FIG. 3b. (It should be noted that FIG. 3b actually depicts a connection of links used in a configuration where the motor is not inertially coupled to either the isolation system base or the suspended platform. This arrangement will be described shortly. However, the same configuration used in FIG. 3b to alter the effective radius of the inner rotor crank arm is also applicable to other embodiments such as the doubly acting inertially fixed embodiments of FIGS. 2e and 2f, as well as the other embodiments shown in this disclosure.) In this embodiment, the effective inner rotor diameter is made equal to the diameter of the connection of the outer rotor rigid link with respect to the rotation center of the actuator Other embodiments (not shown) are also possible where the inertial coupling to the mechanical ground is accomplished through a rotary bearing between the rotary actuator support and the outer rotor. This arrangement is less practical than the inertial connection through a central shaft as shown in FIGS. 2e and 2f, and will not be described further. However, such an arrangement is contemplated herein.

As was mentioned earlier, a flying actuator embodiment is also possible. In a flying actuator embodiment, the rotary actuator need not be inertially coupled to either the vibration isolation system base or the suspended platform. In a flying actuator embodiment, the actuator is allowed to translate with respect to both the vibration isolation base and the suspended platform. However, the actuator is constrained in a manner that allows for application of force between the suspended platform and the base in the controlled motion degree of freedom, from the rotary actuator through the direct drive mechanism. A doubly acting, flying actuator embodiment is shown in FIGS. 3a-b and will be described in more detail in a subsequent section.

Figure 10:
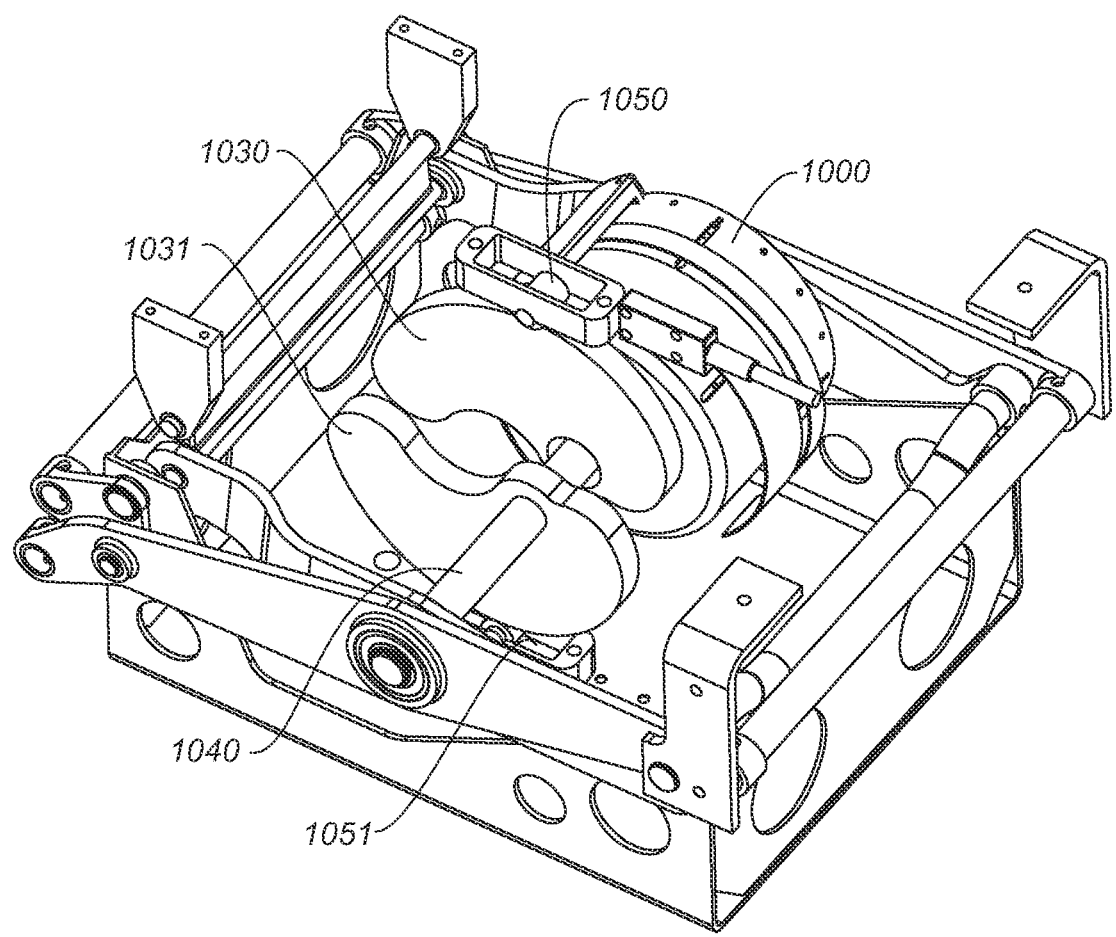
FIG. 10 is a perspective view of an embodiment of an active vibration isolation system using cams and cam followers as the direct drive mechanism.

Other direct drive mechanisms, such as a cam and cam follower, may also be used in place of the rotary link direct drive mechanism. An example direct drive mechanism using a cam and cam follower in a doubly acting flying actuator embodiment is shown in FIG. 10. Cam 1030 is connected to the outer rotor of actuator 1000 and drives cam follower 1050. Cam follower 1050 is connected to the suspended platform (the suspended platform has been omitted in this view to allow the structures underneath to be visible). Cam 1031 is fixed to central shaft 1040 which is fixed to the inner rotor of actuator 100. Cam 1031 drives cam follower 1051, and cam follower 1051 is fixed to the vibration isolation system base. Cam 1030 and cam follower 1050 are analogous to pivoting link 330 of FIG. 3b, and cam 1031 and cam follower 1051 are analogous to link 331 and crank arm 341 of FIG. 3b. It should be noted here that cams and cam followers could be used as direct drive links in other embodiments described herein, and are not limited to use with doubly acting flying actuator embodiments.

Figure 4A:
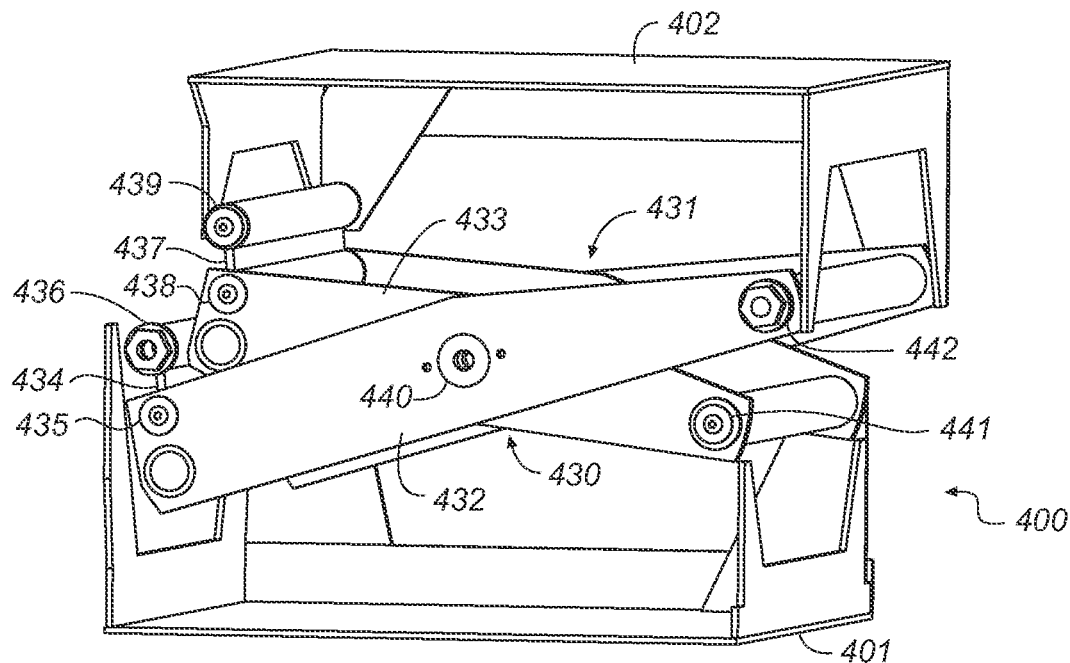
FIG. 4a is a perspective view of a scissors exoskeleton mechanism with some portions of the exoskeleton frame omitted.
Figure 4B:
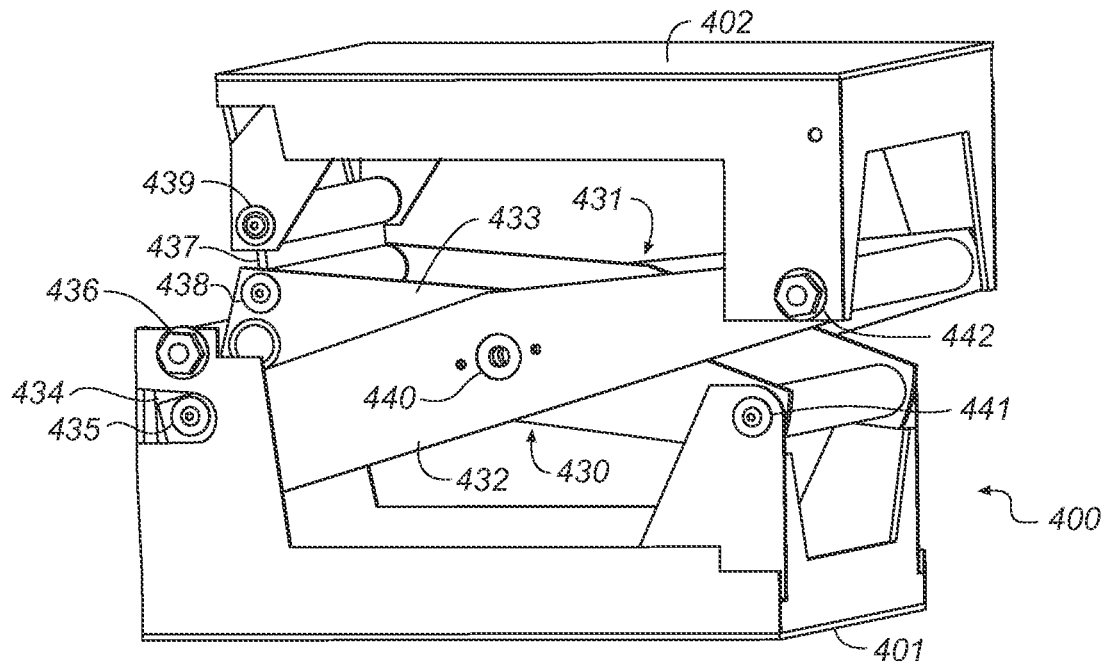

FIGS. 4a and 4b depict an exoskeleton for a vibration isolation system using a scissors mechanism requiring only pivoting links. No sliding contacts or linear bearings are required. FIGS. 4a and 4b provide a perspective view of the scissors exoskeleton support structure 400, where FIG. 4a has some portions of the vibration isolation system frame removed to better show elements of the scissors structure. Structure 400 has two scissors mechanisms mounted on opposite sides of the vibration isolation system. First scissors mechanism 430 includes a pair of main support links 432 and 433 pivotably connected to each other through a centrally mounted bearing 440 forming a first main scissors mechanism on one side of structure 400. A second scissors mechanism 431 is partially visible behind scissors mechanism 430. Second scissors mechanism 431 is identical in structure to scissors mechanism 430 and will not be described further.

Main link 432 is pivotably connected to isolated platform 402 via bearing 442. Main link 432 is also pivotably connected to secondary link 434 via bearing 435. Main link 433 is pivotably connected to vibration isolation base 401 via bearing 441. Main link 433 is also pivotably connected to secondary link 437 via bearing 438. Secondary link 434 is connected to main link 432 as described earlier, and is also pivotably connected to vibration isolation base 401 via bearing 436. Secondary link 437 is coupled to main link 433 as described earlier, and is also pivotably connected to isolated platform 402 via bearing 439. It can be seen that scissors mechanism 430 (and also scissors mechanism 431) do not use any sliding surfaces or linear bearings. Introduction of the secondary links allows the scissors mechanism to function using only rotary bearings. This is beneficial as rotary bearings can be lower cost and more reliable than linear bearings, and have lower friction and freedom from stiction compared to use of sliding surfaces.

It can also be seen that main links 432 and 433 are of unequal length. Use of unequal length main links in a scissors mechanism allows the main links to pass by each other as the suspended platform 102 moves relative to the vibration isolation system base 401. That is, the main links can cross over through the point where the main links are parallel to each other. Allowing a scissors mechanism to move through this crossover point improves overall linearity of motion of the scissors exoskeleton. Moving the crossover point to be close to the midpoint of exoskeleton suspension travel further improves linearity.

As described above, it can be beneficial in a scissors mechanism to replace the sliding surfaces and/or linear bearings that are typically used in traditional scissors mechanisms with secondary pivoting links. One potential drawback to using secondary pivoting links is that motion of the endpoints of the added secondary links is arcurate, rather than linear. The arcurate path introduces motion in another degree of freedom which is not desirable. One way to minimize the motion in this unwanted degree of freedom would be to use long links such that the arcurate motion approximates a linear motion (in the limit as link length goes to infinity, the link end travel approaches true linear motion). However, this may not provide a useable solution as packaging long links can be problematic in many applications. In order to overcome this drawback, both of the added secondary links (links 434 and 437) are oriented in the same direction away from the main link member to which they are attached. They can either point up or down from the main link connection points, as long as each secondary link is orientated in the same direction. When the secondary links are aligned in the same direction (i.e. are parallel) and are of the same length, the error in motion of one secondary link end from linear is compensated for by the second added secondary link.

Structures that tie one scissors mechanism to the other scissors mechanism have not been described, as their structure is not material to the inventions claimed herein. It should be noted that there are various ways the pair of scissors mechanisms can be tied to each other to increase rigidity of the exoskeleton structure, and the embodiments disclosed herein are not limited in the particular manner the scissors mechanisms are coupled to each other.

FIG. 3*a* shows a schematic representation of a doubly acting flying actuator force source embodiment for a vibration isolation system. Details of the exoskeleton and inertial connection of the actuator to the isolation system are omitted in this view. Actuator 300 includes inner rotor 304 and outer rotor 303. Actuator 300 is coupled to direct drive mechanism 305 which includes direct drive links 330, 331, central shaft 340, crank arm 341, and associated bearings, as will be described. Outer rotor 303 is pivotably connected to a first direct drive link 330 via bearing 313. The other end of direct drive link 330 is pivotably connected to suspended platform 302 via bearing 311. Inner rotor 304 is fixed to central shaft 340. In this view, central shaft 340 extends through the actuator along an axis oriented perpendicular to the plane of the paper. Crank arm 341 is fixed to central shaft 340. Crank arm 341 is pivotably connected to a second direct drive link 331. Second direct drive link 331 is also pivotably connected to vibration isolation system base 301.

For the case where it is desired for the actuator 300 to exert a force to cause the suspended platform 302 to be displaced away from the vibration isolation system base 301, the inner rotor 304 rotates in a clockwise manner to exert a downward force through link 331 to the vibration isolation system base 301. Simultaneously, the outer rotor 303 rotates in a counter clockwise manner to exert an upward force through link 330 to suspended platform 302.

FIG. 3*b* shows a physical implementation of the system shown schematically in FIG. 3*a*, with like elements numbered identically in each figure. In FIG. 3*b*, only the actuator and direct drive mechanism are shown. In the perspective view of FIG. 3*b*, it can be seen how central shaft 340 extends out from actuator 300. Not shown is the portion of the central shaft 340 that extends out the back side of actuator 300 and the central shaft 340 supports on both ends, as discussed below. On each end of central shaft 340 is a pair of bearings 350 (only one pair of bearing is visible in FIG. 3*b*). For the case where the force source and direct drive mechanism of FIG. 3*b* are used with a scissors type exoskeleton, the ends of central shaft 340 are rotationally coupled through the bearings 350 to the main scissors pivot points where the main links of each scissors mechanism are coupled to each other. One of the pair of bearings 350 couples the central connecting shaft to a first main scissors link and the second of the pair of bearings couples the central shaft to the second main scissors link.

Figure 5A:
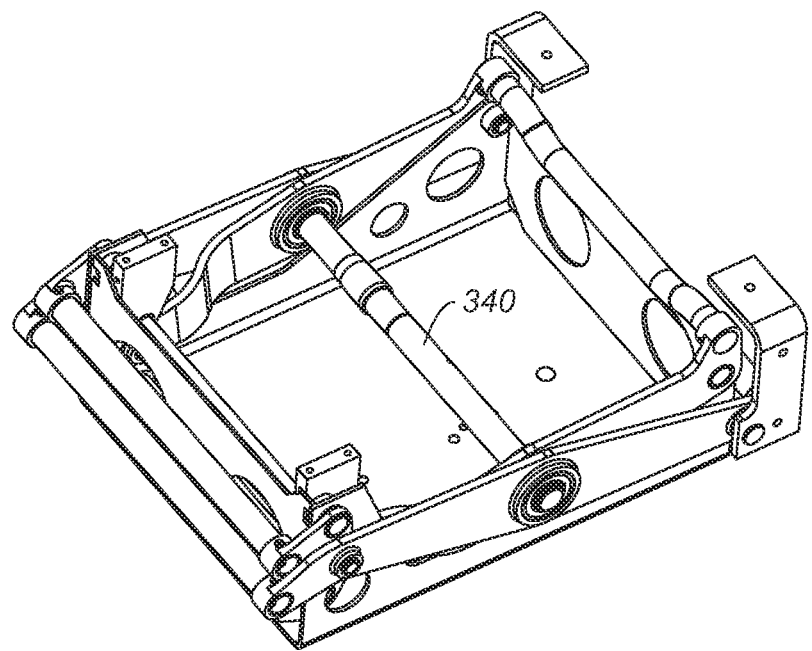
FIG. 5a is perspective view of a scissors exoskeleton in collapsed position.
Figure 5B:
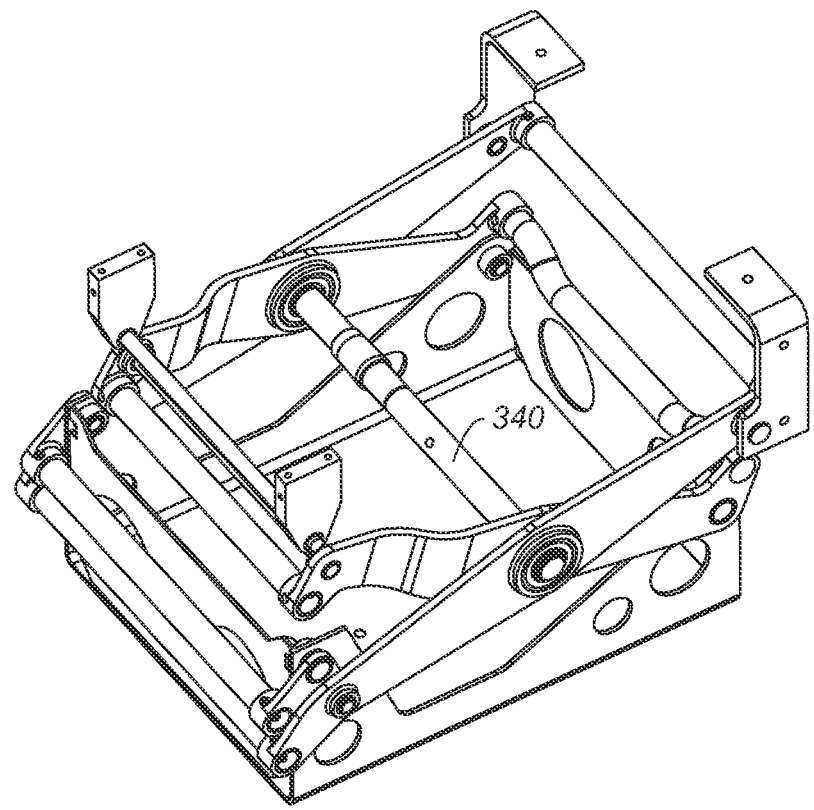
FIG. 5b is perspective view of a scissors exoskeleton in extended position.

Extended and collapsed views of a scissors exoskeleton with a central shaft, but without the force source, direct drive mechanism and the isolated platform, are shown in FIGS. 5*a* and 5*b*. It can be seen that the central shaft will translate in space in the same manner the main scissors pivot points translate in space. The inertia of the actuator is effectively coupled to the scissors pivot points. However, because the central shaft is rotationally coupled to the pivot points through bearings, none of the torque produced by the actuator is coupled through the pivot points into the exoskeleton structure. It should be understood that in a flying actuator embodiment, the actuator need not be inertially coupled to the central connecting shaft. When a scissors mechanism is used as an exoskeleton, connection to the central shaft is convenient but not required. The actuator could be inertially coupled to other portions of the exoskeleton that translate relative to the suspended platform and the vibration isolation system base. Alternatively, a separate support mechanism could be used to support the actuator, apart from the exoskeleton, while allowing the actuator to translate relative to the vibration isolation system base and the suspended platform. It should also be understood that the central shaft which the actuator is coupled to may be concentric or eccentric to reduce the fore-aft inertial influence of the mass of the actuator.

As was mentioned previously, an active vibration isolation system may include a spring mechanism which may have a static spring constant or a controllable spring constant that can be varied under system control in some manner. In some embodiments, the spring mechanism is used to support the vibration isolation platform and its payload to offset static and slowly varying loads. This spring assists the active vibration actuator and thus can reduce the average power consumption and/or reduce the size of the actuator required in an active vibration isolating system, where the active actuator is an electro-actuator as opposed to a hydraulic actuator. When a variable spring such as an air spring is available, the actuator does not need to support the static load. In some embodiments, an air spring can be coupled between the suspended platform and the vibration isolation system base.

Figure 6:
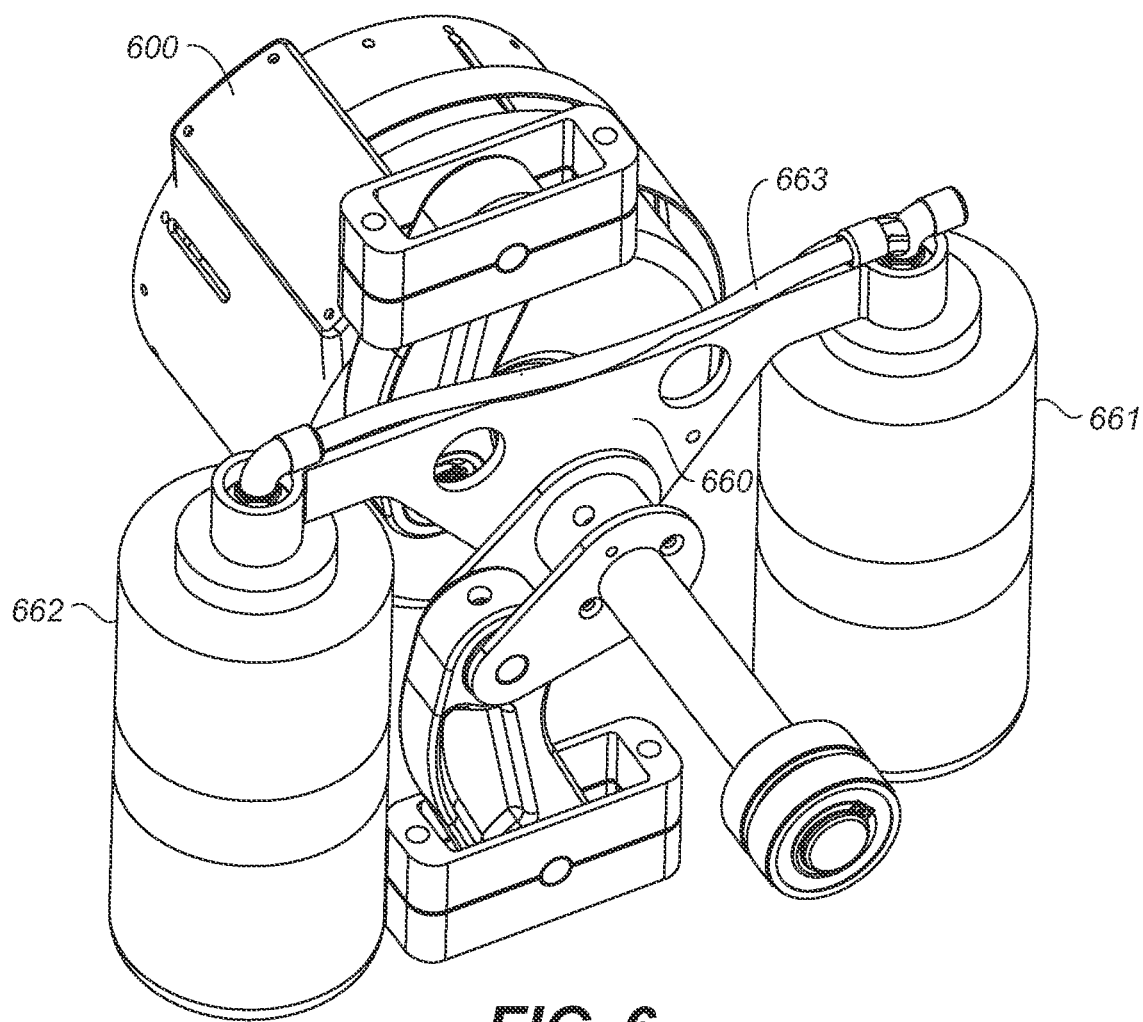
FIG. 6 is a perspective view of a doubly acting flying actuator showing the actuator, drive links, central shaft, and pneumatic springs.

As the ratio of collapsed height versus stroke of the vibration isolation platform approaches one to one, conventional pneumatic springs are no longer capable of meeting the application performance requirements. In some embodiments where a ratio close to 1 is desired, one alternative connects the pneumatic springs to the central shaft by way of a yoke and bearings. This permits the achievement of very compact designs. In this configuration, two times the pneumatic force is required to support a given platform load while one half the pneumatic spring stroke is required. FIG. 6 depicts the same structures as shown in FIG. 3*b*, with the addition of yoke 660, pneumatic springs 661 and 662, a portion of the air control line 663. Not shown is a rotary bearing which rotationally couples the yoke 660 to the central shaft 340. A pair of pneumatic springs is used in part because twice the force is needed when connecting the spring to the central shaft where displacement of the central shaft is ½ the displacement of the suspended platform. Additionally, using a pair of air springs improves symmetry and helps keep the system from rocking as it operates over its travel range.

Figure 7:
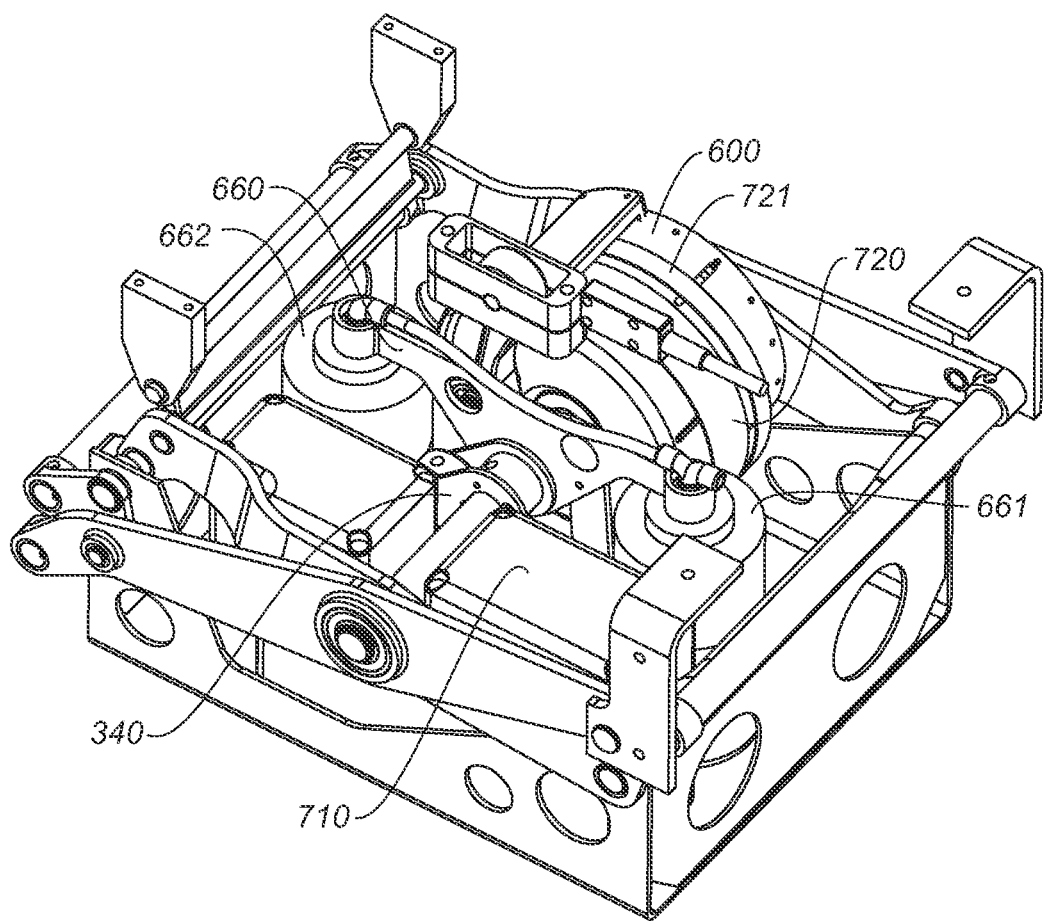
FIG. 7 is a (rotated) perspective view of the system of FIG. 6 incorporated into the exoskeleton assembly of FIG. 5b.

FIG. 7 shows the structure of FIG. 6 integrated into the exoskeleton and central shaft of FIG. 5. The only added element not shown in FIGS. 5 a-b, or FIG. 6 are electronics modules 710. These modules contain the active vibration isolation system electronics such as the system controller, the motor controller and power amplifier, the system power supply, etc. It can be seen that actuator 600 is offset to the side to the vibration isolation base. This allows room for electronics modules 710 to be packaged within the envelope of the vibration isolation base. Additionally, by offsetting the position of the rotary actuator, the drive mechanism can be arranged to drive the suspended platform at or near the center of gravity of the suspended plant.

Also shown in FIG. 7 are flexible ribbon cables 720 and 721 for providing electrical signals to and accepting electrical signals from actuator 600. These cables provide power to actuator 600 and receive signals from sensors located within actuator 600. A flexible cable is required embodiments where the actuator translates in space relative to the location of the system electronics module (typically in the vibration isolation system base) to accommodate the relative motion. Additionally, for embodiments where the outer rotor rotates relative to the location of the system electronics, the cable must accommodate this relative rotation also. In a doubly acting flying motor embodiment (such is shown in FIG. 7), the outer rotor rotates clockwise as it translates upward from the isolation system base thus unwinding the ribbon cables and rotates counter clockwise as it translates downward towards the isolation system base, thus winding and unwinding the flexible ribbon cables around the outside of the actuator housing. By running the cables around the outside of the actuator housing in this manner, the radius of curvature of the ribbon cable can be kept large, which reduces the bending stresses seen by the cable as it is flexed.

The various embodiments previously described all employ rotary bearings to couple various elements of the system together. It is desirable that these bearings have minimal friction, lash, stiction, etc. over their useful service life so as not to introduce problems for the closed loop vibration controller. Due to tolerances and wear over time, it can be difficult to guarantee lash free behavior over the expected operating life of a system. One way to minimize lash in bearings is to ensure that the bearings are pre-loaded under all operating conditions, over the product life.

Figure 8:
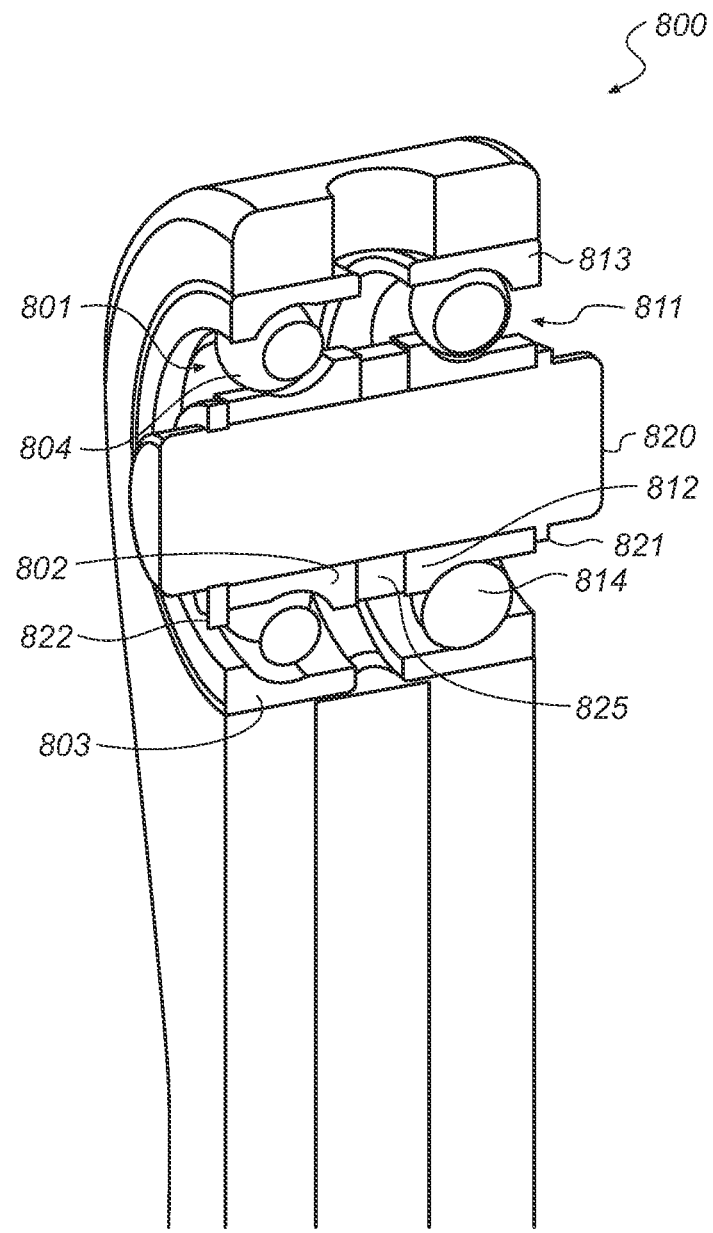
FIG. 8 is a cutaway view of one end of a drive link.

FIG. 8 shows a portion of a single direct drive link 800 that includes elements to provide pre-load for the rotary bearings. If more than one drive link is used in a system, each bearing assembly in each drive link would use a similar construction to what will be described for link 800. Additionally, a similar bearing construction can be used for the various system bearings as needed. A pair of angular contact bearings 801, 811, is located at each end of link 800 (only one end is shown in FIG. 8). Bearing 801 is comprised of inner race 802, outer race 803, and balls 804 that are captured between inner race 802 and outer race 803. Bearing 811 is comprised of inner race 812, outer race 813, and balls 814 that are captured between inner race 812 and outer race 813. Link shaft 820 is fit into the ID of the inner bearing races 802 and 812. Shaft 820 has shoulder 821 that rests up against inner race 812. On the opposite side of the link 820, retaining clip 822 is fit around shaft 820 and pressed up against the outer diameter of inner race 802, to hold shaft 820 in place.

Bearings 801 and 811 are pressed into a bore in which the inner races 802 and 812 oppose one another. As outer races 803 and 813 are pressed into the bore, they impose a load on the balls 804 and 814 that in turn load the inner races that oppose one another. This press fit operates to pre-load the balls against the inner races. In some embodiments, the inner races are pressed together directly. One drawback to this arrangement is that as the bearings wear, lash or play can develop. In the embodiment shown in FIG. 8, a compliant element, spring element 825, (which in one non limiting example is an elastomer, in another non limiting example is a wave spring) is positioned between inner races 802 and 812. As the outer races 803 and 813 are seated to a set depth of bore, the spring 825 is preloaded. This preload can accommodate a significant amount of bearing wear and thermal change while maintaining a preloaded state.

In some embodiments, a shallow contact angle is advantageous, typically designated as "C" type angular contact or about 15 degrees of contact angle on each bearing set in opposition to the other. The result is higher linkage transverse or radial loading capability vs. a 45 degree contact angle and consequently a lower preload requirement to resist the movement of the inner races on a sliding fit shaft for a given thrust load imposed on the link.

Figure 9A:
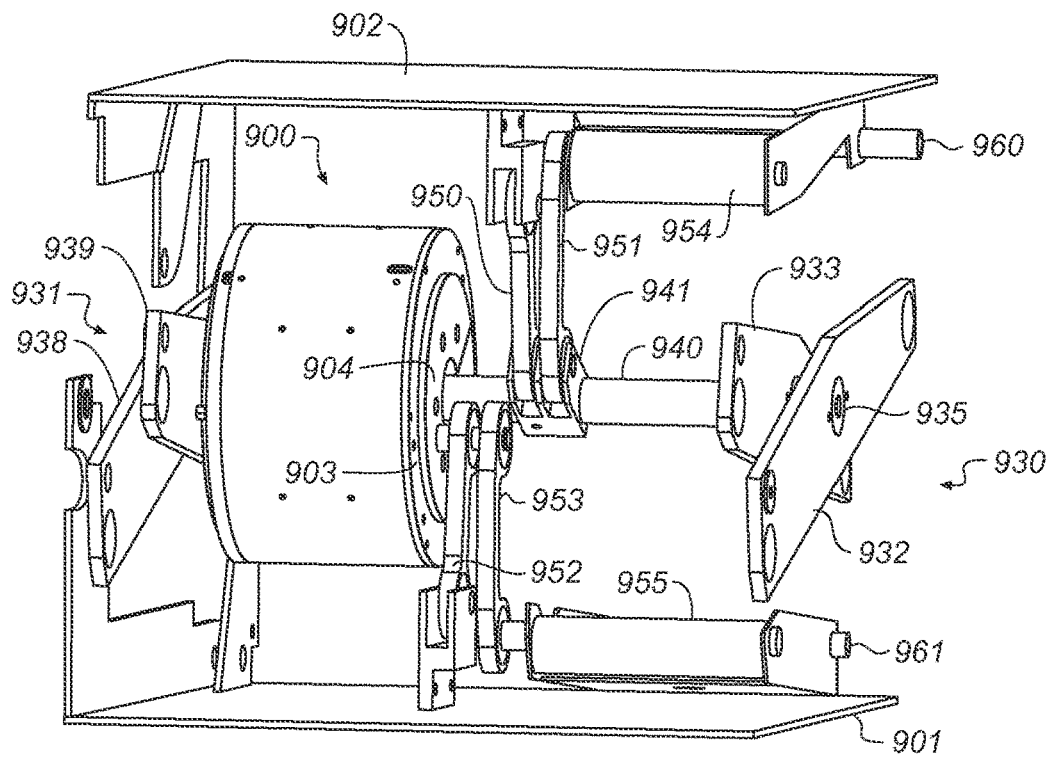
FIG. 9a is a perspective view of select portions of a vibration isolation system showing an embodiment having a spring support and link arrangement for preload of drive links.
Figure 9B:
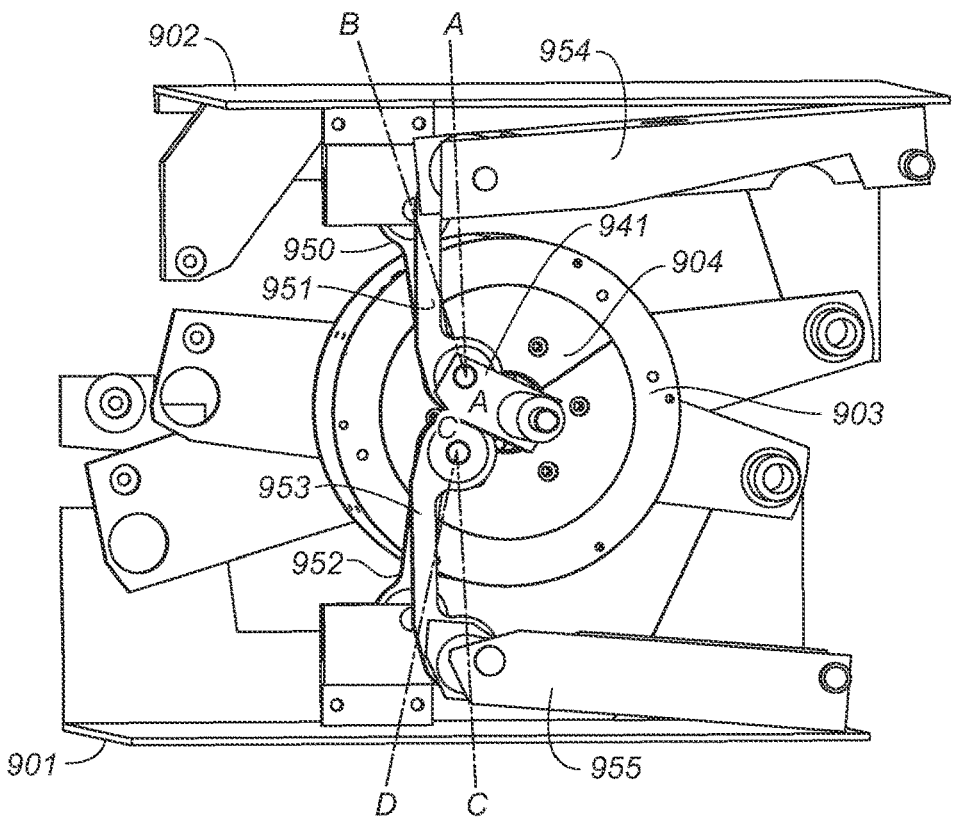
FIG. 9b is another perspective view of select portions of a vibration isolation system of FIG. 9a showing the orientation of the system drive links.

FIGS. 9a-b show an alternative arrangement of drive links and an alternative way to package a spring for offloading the static load seen by the actuator. One benefit of the arrangement of elements disclosed in FIGS. 9a-b is that gravity can be used to provide preload of the drive links. A second benefit allows the force vs. displacement characteristic of the air spring to be altered by arranging drive links in a particular manner. In FIG. 9a, a number of elements of a vibration isolation system have been omitted to better show the relevant parts of the system. Wall sections of the isolation system base 901 and the suspended platform 902 have been omitted and portions of the exoskeleton are not shown so that the drive linkage and spring coupling structure are visible. Actuator 900 incorporates inner rotor 904 and outer rotor 903. Fixed to inner rotor 904 is central shaft 940. Central shaft 940 is rotationally coupled to the central pivot points of scissors mechanisms 930 and 931. Central pivot point 935 of scissors mechanism 930 is visible while the central pivot point for scissors mechanism 931 is obscured by actuator 900 in this view. Scissors mechanism 930 incorporates main scissors links 932 and 933. Scissors mechanism 931 incorporates main scissors links 938 and 939. Secondary links for scissors mechanisms 930 and 931 are not shown. While a scissors mechanism is used as the exoskeleton in the embodiment of FIGS. 9a-b, it should be understood that the drive link arrangement and spring support mechanism shown in the FIGS. 9a-b and described below can be used with various types of exoskeletons, and are not limited to use with scissors mechanism (whether they use sliding surfaces, linear bearings, or secondary linkage arrangements).

A spring element (not shown) resides within a spring support structure consisting of upper spring support 954 and lower spring support 955. In one non-limiting example, the spring element is a pneumatic (air) spring. However, other spring elements could be used in place of the pneumatic spring. Upper spring support 954 is rotationally coupled to drive link 951. Drive link 951 is rotationally coupled to crank arm 941. Crank arm 941 is fixed to central shaft 940, and central shaft 940 is fixed to inner rotor 904. Upper spring support 954 is also rotationally coupled to suspended platform 902 via pivot pin 960 (which may also be a rotary bearing, a rotationally compliant bushing, a flexure, or other elements that allows rotation but constrains other relative motion), so that upper spring support 954 can tilt with respect to suspended platform 902.

Inner rotor 904 also connects to central shaft 940, crank arm 941, and drive link 950. Drive link 950 is rotationally coupled to crank arm 941 via a rotary bearing, and in one non limiting example is also rotationally coupled to suspended platform 902 via a rotary bearing.

Lower spring support 955 is rotationally coupled to drive link 953. Drive link 953 is rotationally coupled to outer rotor 903 via a crank pin. Lower spring support 955 is also rotationally coupled to vibration isolation system base 901 via pivot pin 961 (which may also be a rotary bearing, a rotationally compliant bushing, a flexure, or other elements that allows rotation but constrains other relative motion), so that lower spring support 955 can tilt with respect to vibration isolation system base 901. Outer rotor 903 is also rotationally coupled to drive link 952, and drive link 952 is rotationally coupled to vibration isolation system base 901.

Operation of the arrangement of drive links depicted in FIGS. 9*a-b* can be understood as follows. Assume initially that no spring element is present, a weight is applied to the suspended platform, and the actuator is commanded to produce an output force to try to hold the suspended platform is a fixed position. When the weight is applied, a force is produced that attempts to reduce the spacing between the suspended platform and the vibration isolation system base. The applied weight produces a force that pushes on drive link 950 causing it to apply a counterclockwise torque to the inner rotor 904. Additionally, the weight also produces a force that pushes (upward) on drive link 952 causing it to apply a clockwise torque to outer rotor 903. In order to resist displacement of the suspended platform, the actuator needs to output forces (torques) to counter those generated by the applied weight. The actuator is commanded to simultaneously output a clockwise torque to inner rotor 904 and a counterclockwise torque to outer rotor 903. The result is that both links 950 and 952 are loaded in compression. Drive links 950 and 952 are effectively pre-loaded by the added weight.

In the embodiment of FIG. 6, a pair of air springs are coupled between the central shaft via yoke mechanism 660 and the vibration isolation system base (not shown in FIG. 6). These springs offset the static load l(weight), and as a result remove the preload on the links which removes the preload on the rotational coupling mechanism (typically rotary bearings but may be other mechanism as described earlier). One method to compensate for this removal of preload is to add the extra elements of FIG. 8 to the bearing structures, as was described earlier. An alternative is to employ the spring support mechanism and extra pair of drive links 951 and 953 shown in FIG. 9*a-b*, to apply a preload to the bearing systems while allowing the spring to offset the static loads.

Assume now that a spring element is placed into the system between spring support elements 954 and 955. When a weight is applied to the system, drive links 950 and 952 are "pushed" on, as they were when no spring was present. Link 950 is pushed down, which causes counterclockwise rotation of crank arm 941, as before. However, drive link 951 is also attached to crank arm 941, and as crank arm 941 rotates counterclockwise, drive link 951 is "pulled" down. Drive link 951, since it is connected to upper spring support 954 pulls on upper spring support 954 and acts to tilt it down. Additionally, when the weight is applied, drive link 952 is "pushed" up which causes outer rotor 903 to rotate clockwise. Drive link 953 is connected to outer rotor 903, and when outer rotor 903 rotates clockwise, drive link 953 is "pulled" up. Since drive link 953 is connected to lower spring support 955, lower spring support 955 will be tilted up. The result is that the upper and lower spring supports are tilted towards each other compressing the spring located between them. When the spring is displaced it exerts a force proportional to the displacement, which results in the application of preload to the links and rotational coupling mechanisms, while the static load is offset from the motor and is supported by the spring. Links 950 and 952 are held in compression and links 951 and 953 are held in tension as long as there is some static load present. If for some reason the suspended platform experienced 0 g, then the preload would not be present, but this will generally not be a problem in typical applications when gravity is present.

One additional benefit arises from the use of the links as shown in FIGS. 9*a-b*. It is possible to alter the geometry of the drive link mechanism to vary the force applied to the spring as a function of displacement of the system. It turns out that typical pneumatic springs usable in this application output a different force when the spring is extended a fixed distance away from its nominal center than it outputs when it is compressed inward away from its nominal center by the same distance. This particular non-linear behavior can be offset by arrangement of link geometry, which can provide the benefit of reducing the maximum force output requirement of the actuator in a particular application.

The arrangement in FIG. 9*b* provides the desired modification in force vs. displacement applied to a spring element placed between upper spring support 954 and lower spring support 955. It can be seen that drive links 950 and 951 are non-parallel, and drive links 952 and 953 are non parallel. Additionally, drive links 950 and 951 may be of different length, and drive links 952 and 953 may be of different length. Adjusting the offset angle between the pairs of drive links and/or adjusting relative lengths of links are used to alter the force vs. displacement characteristic, and adjustment of link geometry can be used to compensate for non ideal behavior of the spring element.

In FIG. 9*b*, axis A-A passes through the rotation center of link 951 at its connection to crank arm 941, and the center of rotation of the connection of link 951 to upper spring support 954. Axis A-B passes through the rotation center of link 950 at its connection to crank arm 941 (which is coincident with the rotation center of link 951's connection to crank arm 941), and the center of rotation of the connection of link 950 to suspended platform 950. Axis C-C passes through the rotation center of link 953 at its connection to outer rotor 903 and through the rotation center of the connection of link 953 with lower spring support 955. Axis C-D passes through the rotation center of link 952 at its connection to outer rotor 903 (which is concentric with the connection of link 953 to outer rotor 903) and through the rotation center of the connection of link 952 with vibration isolation base 901. It can be seen that axes A-A and A-B are non-parallel, and axes C-C and C-D are non-parallel.

A number of implementations have been described. Nevertheless, it will be understood that additional modifications may be made without departing from the spirit and scope of the inventive concepts described herein, and, accordingly, other embodiments are within the scope of the following claims.

What is claimed is:

1. A vibration isolation system interposed between a platform and a base, the system comprising:
    an electric motor comprising a first rotor and a second rotor;
    a first drive link with a first end and a second end, wherein the first end of the first drive link is rotatably attached to the first rotor so that the first drive link is configured to rotate relative to the first rotor, and the second end of the first drive link is rotatably attached to the platform, wherein the first drive link is configured to rotate about an axis parallel to an axis of rotation of the first rotor; and a second drive link with a first end and a second end, wherein the first end of the second drive link is rotatably attached to the second rotor so that the second drive link is configured to rotate relative to the second rotor, and the second end of the second drive link is rotatably attached to the base, wherein the second drive link is configured to rotate about an axis parallel to an axis of rotation of the second rotor.

2. The vibration isolation system of claim 1 wherein a first force produced by the electric motor is transmitted by the first drive link to the platform and a second force produced by the electric motor is transmitted by the second drive link to the base.

3. The vibration isolation system of claim 1 wherein a relative rotation between the first and second rotors with respect to each other is less than one full revolution for displacement of the platform relative to the base over an entire range of travel.

4. The vibration isolation system of claim 1 wherein one of the first rotor and the second rotor is connected to a crank arm via a central shaft, wherein the crank arm is rotatably attached to one of the first end of the first drive link and the first end of the second drive link.

5. The vibration isolation system of claim 4 further comprising a bearing wherein the crank arm is rotatably attached to one of the first drive link and the second drive link with the bearing.

6. The vibration isolation system of claim 1 further comprising a bearing, wherein the first end of the first drive link is rotatably attached to the first rotor with the bearing.

7. The vibration isolation system of claim 1 further comprising a bearing, wherein the second end of the first drive link is rotatably attached to the platform with the bearing.

8. The vibration isolation system of claim 1 further comprising a bearing, wherein the first end of the second drive link is rotatably attached to the second rotor with the bearing.

9. The vibration isolation system of claim 1 further comprising a bearing, wherein the second end of the second drive link is rotatably attached to the base with the bearing.

10. The vibration isolation system of claim 1, wherein the vibration isolation system supports a seat in a vehicle.

11. The vibration isolation system of claim 1, wherein the electric motor is free to translate relative to the platform and to the base.

12. The vibration isolation system of claim 1, wherein the first rotor and second rotor are concentric with one another.

13. The vibration isolation system of claim 1, wherein the first rotor and the second rotor are concentric with one another.

14. The vibration isolation system of claim 1, wherein the first rotor and the second rotor are magnetically coupled.

15. The vibration isolation system of claim 1, wherein the first rotor is directly attached to the first drive link, and wherein the second rotor is directly attached to the second drive link.

16. A vibration isolation system interposed between a platform and a base, the system comprising:

an electric motor comprising a first rotor and a second rotor, wherein the first rotor and second rotor are concentric with one another, and wherein the electric motor is configured to translate relative to the platform and to the base;

a first drive link attached at a first end to the first rotor and at a second end to the platform; and a second drive link attached at a first end to the second rotor and at a second end to the base, wherein the first drive link is attached to the first rotor at a single attachment point, and wherein the second drive link is attached to the second rotor at a single attachment point.

17. The vibration isolation system of claim 16, wherein the first drive link is configured and arranged to rotate relative to the first rotor about the single attachment point between the first drive link and the first rotor.

18. The vibration isolation system of claim 16, wherein the second drive link is configured and arranged to rotate relative to the second rotor about the single attachment point between the second rotor and the second drive link.

19. The vibration isolation system of claim 16, wherein the vibration isolation system supports a seat in a vehicle.

20. The vibration isolation system of claim 19, wherein the seat is attached to the platform.

21. The vibration isolation system of claim 16, wherein the first drive link is rotatably attached to the first rotor and rotates about an axis parallel to an axis of rotation of the first rotor, and wherein the second drive link is rotatably attached to the second rotor and rotates about an axis parallel to an axis of rotation of the second rotor.

22. The vibration isolation system of claim 16, wherein the first rotor and the second rotor are magnetically coupled.

23. The vibration isolation system of claim 16, wherein the first rotor is directly attached to the first drive link, and wherein the second rotor is directly attached to the second drive link.

* * * * *